United States Patent [19]

Yoshimura

[11] Patent Number: 5,029,086

[45] Date of Patent: Jul. 2, 1991

[54] APPARATUS AND METHOD FOR SHIFT CONTROL OF AUTOMATIC TRANSMISSION

[75] Inventor: Hiroshi Yoshimura, Hiroshima, Japan

[73] Assignee: Mazda Motor Corporation, Hiroshima, Japan

[21] Appl. No.: 302,767

[22] Filed: Jan. 27, 1989

[30] Foreign Application Priority Data

Jan. 30, 1988 [JP] Japan .................. 63-20206
Apr. 29, 1988 [JP] Japan .................. 63-106753

[51] Int. Cl.$^5$ ................. B60K 41/18; G05D 17/02
[52] U.S. Cl. ..................... 364/424.1; 74/866; 74/867; 364/165
[58] Field of Search .............. 364/424.1, 164, 165; 74/861, 866, 867, 868

[56] References Cited

U.S. PATENT DOCUMENTS

| | | | |
|---|---|---|---|
| 3,109,970 | 11/1963 | Smyth .................. | 364/165 |
| 4,031,782 | 6/1977 | Miller et al. .......... | 74/866 |
| 4,283,970 | 8/1981 | Vulkovich ............ | 74/866 |
| 4,350,058 | 9/1982 | Miller et al. .......... | 74/866 |
| 4,670,843 | 6/1987 | Matsumura et al. ... | 364/424.1 |
| 4,791,568 | 12/1988 | Hiramatsu et al. .... | 364/424.1 |
| 4,793,216 | 12/1988 | Hiramatsu et al. .... | 74/866 |
| 4,868,753 | 9/1989 | Mori .................... | 364/424.1 |

Primary Examiner—Fleix D. Gruber
Attorney, Agent, or Firm—Fish & Richardson

[57] ABSTRACT

Disclosed is a shift control for an automatic transmission adapted to shift speed ranges by coupling or decoupling of the friction coupling elements mounted on the transmission mechanism.

The coupling force of the friction coupling elements is subjected to feed-forward control during a preset period after a signal of instruction for shifting was given. A control value for the feed-forward control is determined in accordance with control value characteristics which vary from a given initial value at a constant change rate.

After the preset period, coupling force of the friction coupling element is feed-back controlled by of actual revolutions of an input shaft of the transmission mechanism. A final control value for the feed-back control is determined by determining a target change rate in the feed-back control by an amount of change in revolutions number of the input shaft of the transmission mechanism estimated by shifting and a set time for the feed-back control. With the target change rate, a target number of revolutions for each of plural control cycles obtainable by dividing the set time into portions. For each of the control cycles, the final control value is determined by comparing the actual number of revolutions of the input shaft and the target number of revolutions.

24 Claims, 30 Drawing Sheets

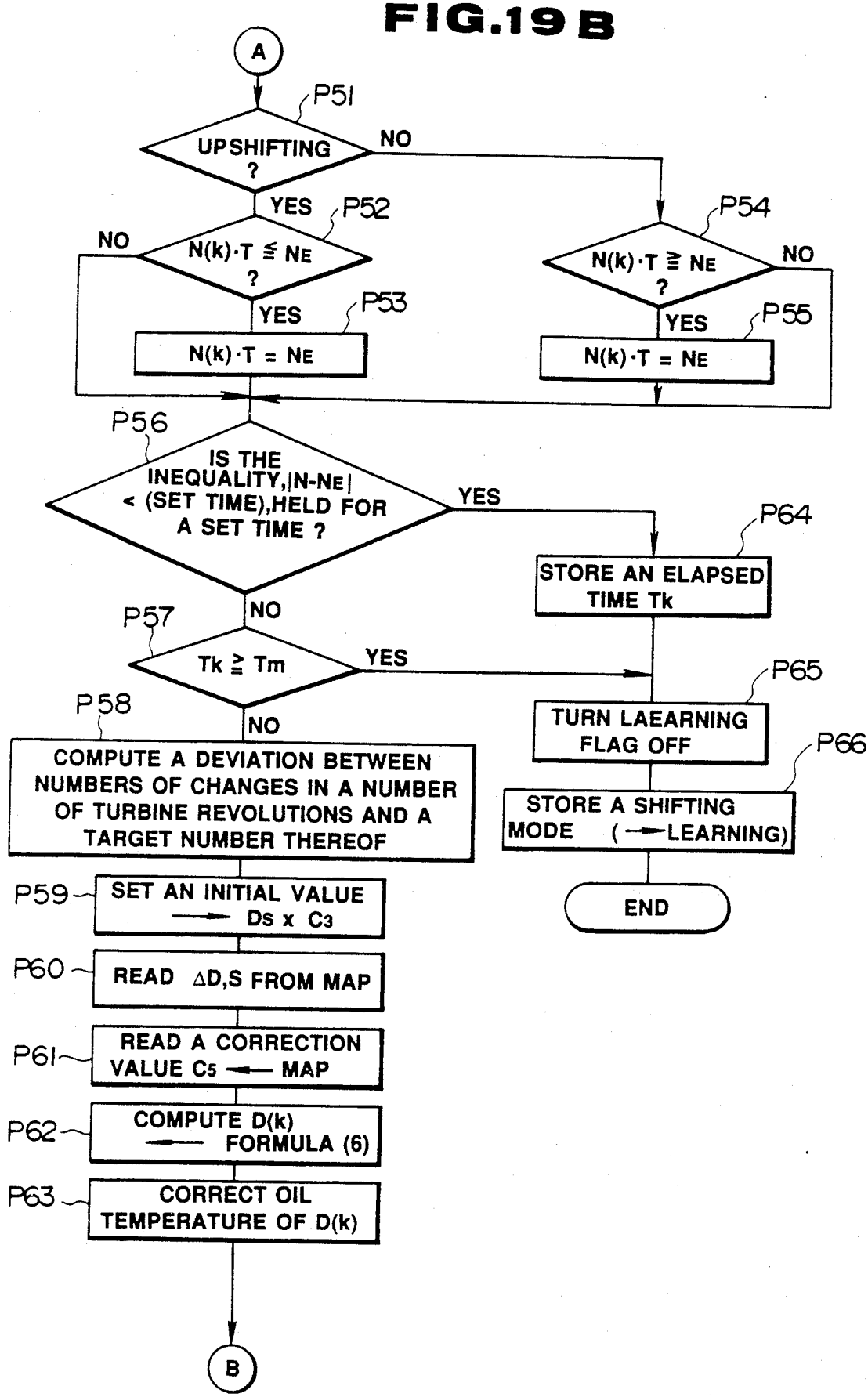

FIG.22A

| DEGREE OF THROTTLE OPENING | 0/8 | 1/8 | 2/8 | 3/8 | 4/8 | 5/8 | 6/8 | 7/8 | 8/8 |
|---|---|---|---|---|---|---|---|---|---|
| DUo | B2 | AB | A4 | 9D | 96 | 8F | 88 | 81 | 7A |

FIG.22B

| DEGREE OF THROTTLE OPENING | 0/8 | 1/8 | 2/8 | 3/8 | 4/8 | 5/8 | 6/8 | 7/8 | 8/8 |
|---|---|---|---|---|---|---|---|---|---|
| tT | 02 | 02 | 02 | 03 | 03 | 03 | 04 | 04 | 04 |

(01=0.1sec)

FIG.22C

| OIL TEMP (°C) | 0 | 20 | 40 | 60 | 80 |
|---|---|---|---|---|---|
| ΔDU | 01 | 01 | 02 | 02 | 02 |
| DU(min) | 33 | 36 | 39 | 3C | 40 |
| DU(max) | B3 | B6 | B9 | BC | C0 |

FIG.22D

| |DIFFERENCE| (sec) | 0 | 0.1 | 0.2 | 0.3 | 0.4 | 0.5 | 0.6 | 0.7 |
|---|---|---|---|---|---|---|---|---|---|
| ΔDUo | 0 | 01 | 01 | 02 | 02 | 02 | 03 | 03 |

FIG.22E

| DEGREE OF THROTTLE OPENING | 0/8 | 1/8 | 2/8 | 3/8 | 4/8 | 5/8 | 6/8 | 7/8 | 8/8 |
|---|---|---|---|---|---|---|---|---|---|
| Tm | 04 | 04 | 04 | 05 | 05 | 05 | 05 | 05 | 05 |

(01=0.1sec)

FIG.22F

| OIL TEMP (°C) | 0 | 20 | 40 | 60 | 80 |
|---|---|---|---|---|---|
| ΔDUr | 01 | 01 | 02 | 02 | 02 |
| DUr(min) | 33 | 36 | 39 | 3C | 40 |
| DUr(max) | B3 | B6 | B9 | BC | C0 |

FIG.22G

| |DIFFERENCE| (sec) | 0 | 0.1 | 0.2 | 0.3 | 0.4 | 0.5 |
|---|---|---|---|---|---|---|
| ΔDUrr | 0 | 01 | 01 | 01 | 02 | 02 |

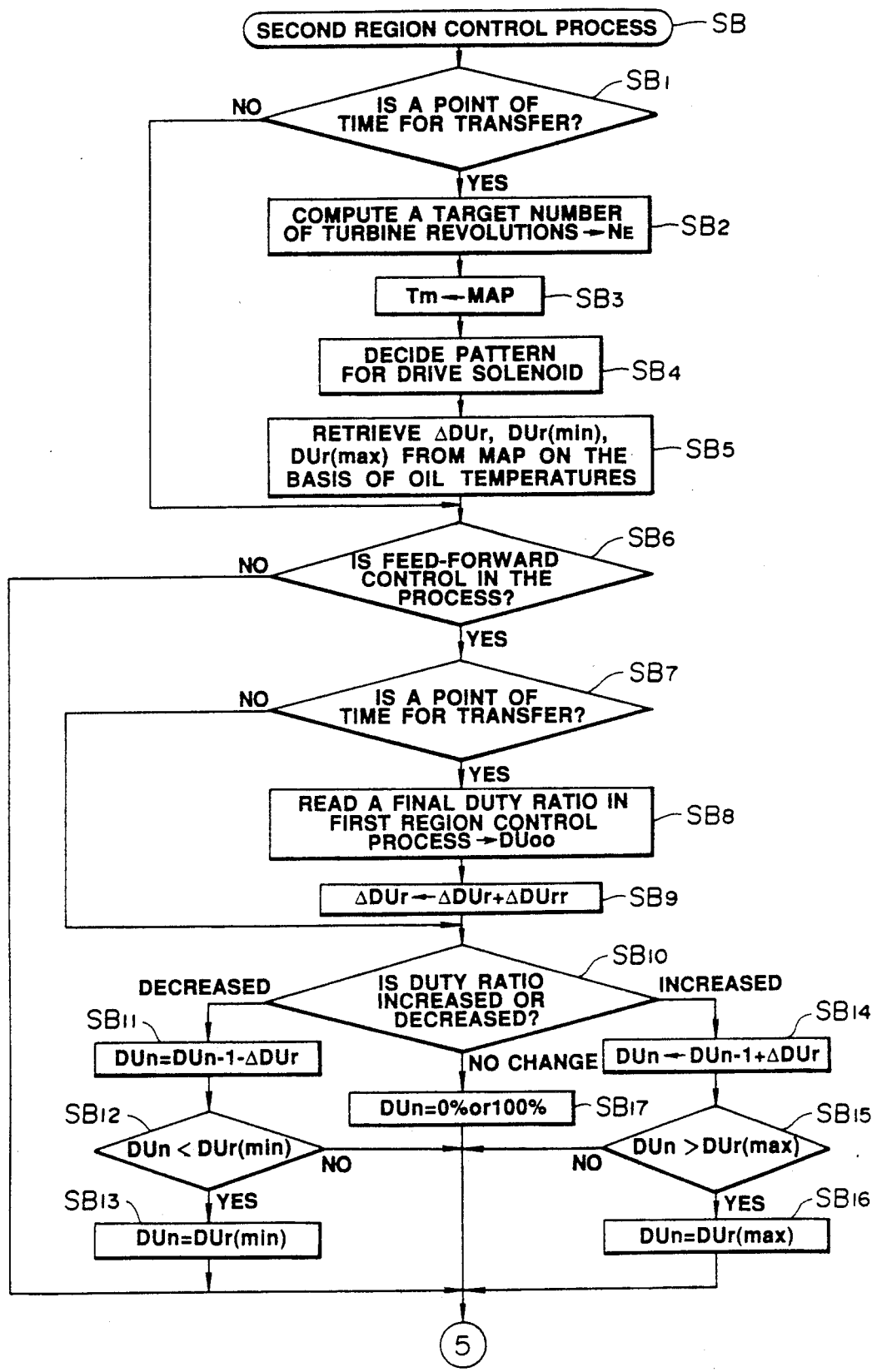

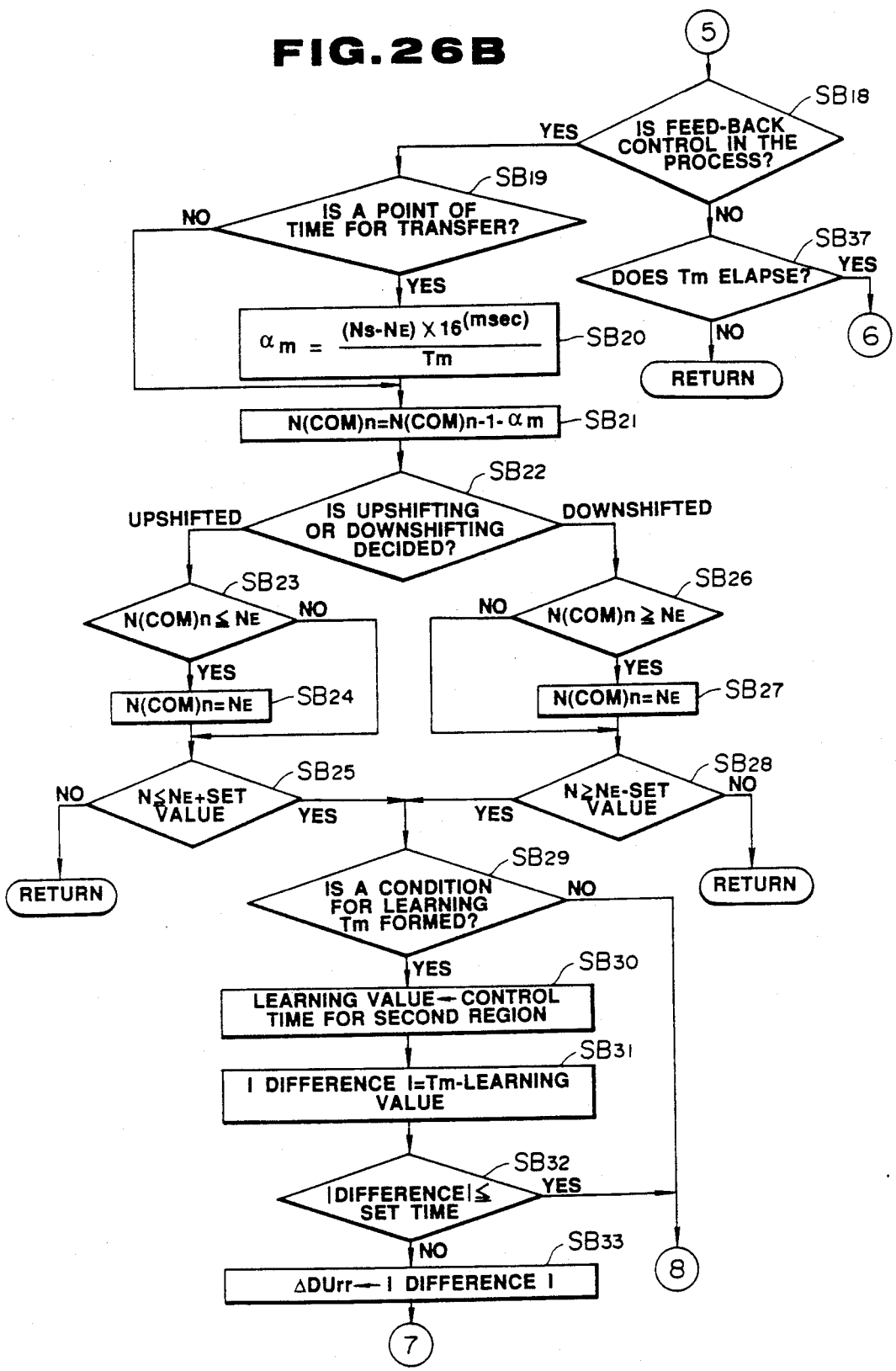

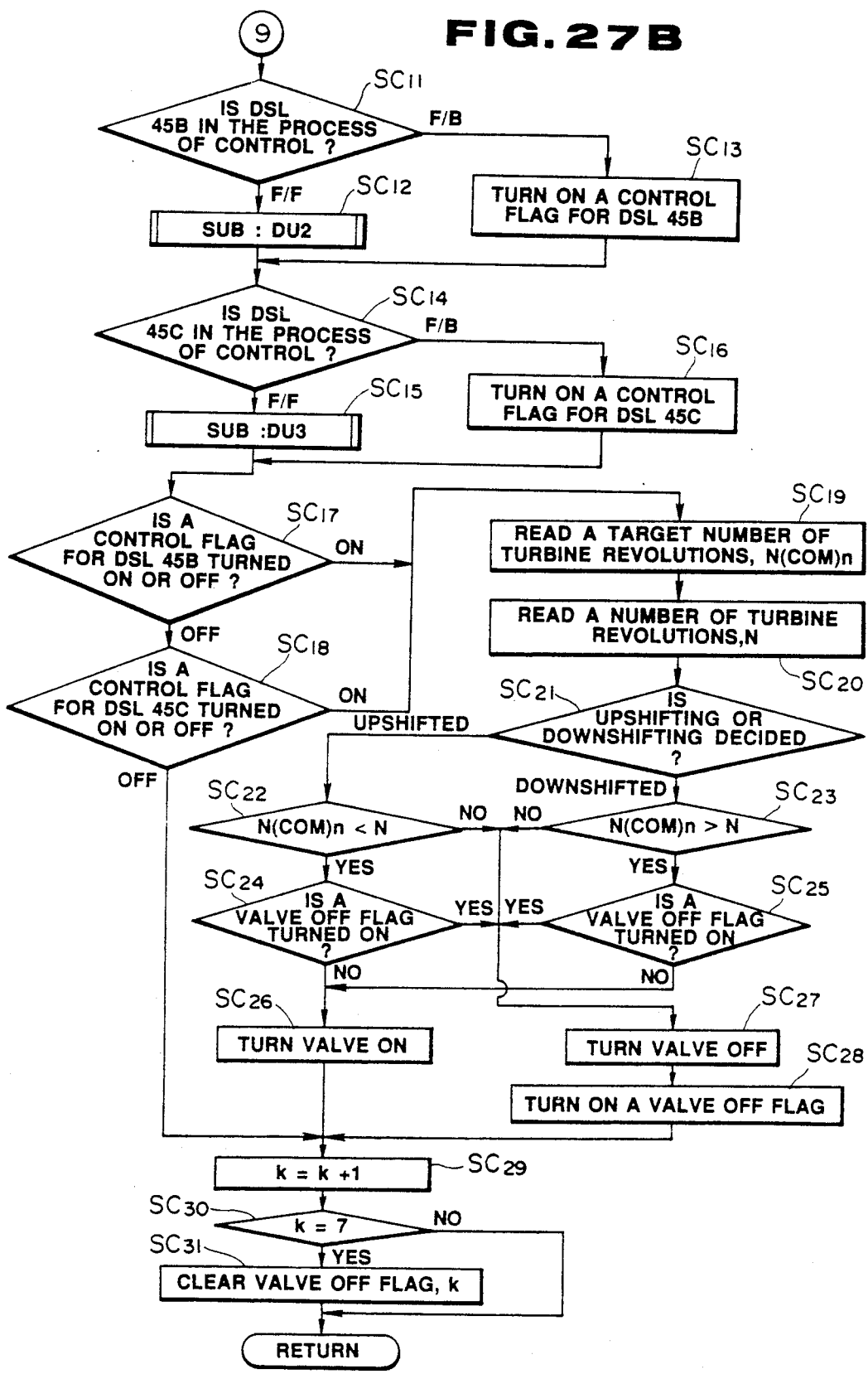

APPARATUS AND METHOD FOR SHIFT CONTROL OF AUTOMATIC TRANSMISSION

BACKGROUND OF THE INVENTION

1. Field of the Invention

The present invention relates to an apparatus and a method for the shift control of an automatic transmission and, more particularly, to a shift control apparatus and a shift control method for the shift control of an automatic transmission adapted to control coupling force of a friction coupling element at the time of shifting.

2. Description of Related Art

An automatic transmission generally comprises a torque converter and a transmission mechanism using a planetary gear mechanism which in turn is provided with friction coupling elements for shifting such as a variety of clutches and brakes for shifting power transmission passages in such a manner that they are operable by oil pressure control circuits. The shifting of speed ranges is performed by coupling or uncoupling, or releasing the coupling of, the friction coupling element by means of control of a solenoid valve mounted in the oil pressure control circuits. The switching of the friction coupling elements from a coupled state to an uncoupled or released state or vice verse may cause torque shock unless changes of coupling force are adjusted in an appropriate manner.

In order to solve such a problem, attempts have been made so far to regulate coupling force of friction coupling elements at the time of shifting speed ranges. For example, Japanese Patent Publication (kokai) No. 10,851/1981 (a U.S. counterpart being U.S. Pat. No. 4,283,970) discloses an apparatus in which friction coupling elements are supplied with oil pressures in such a manner as changing coupling force at the time of shifting and concurrently an actual shift time, namely, a period of time required actually for shifting speed ranges, is adjusted so as to correspond to a reference shift value of a shift time set in advance by subjecting the oil pressures to correction control in accordance with a difference between the reference shift value and the actual shift time.

It has been found difficult, however, to adjust changes of torque and numbers of revolutions during the step of shifting speed ranges merely by subjecting the oil pressures fed to the friction coupling elements in accordance with a shift time and to reduce torque shock to a sufficient degree.

It is to be noted that torque of an output shaft of a transmission and a running gear ratio, namely, a ratio of velocity on the input side to that on the output side of the transmission mechanism, vary during shifting as shown in FIG. 4 so that the running gear ratio should not vary for a transient period of time due to delay in a supply of oil pressure and in changes of revolutions of a turbine after a signal for instruction for shifting has been given. In this specification, this transient period of time is called "first region". After the transient period of time, namely, after the first region, the running gear ratio is caused to change and reach a predetermined gear ratio for the speed range sought to be shifted. In this specification, this period is called "second region", and a period of time after the second region, that is, after completion of the shifting, is called "third region". It is to be understood herein that, in the first region, although no running gear ratio, namely, no revolutions of the turbine is changed, torque of the output shaft is changed so that a change in the torque of the output shaft should be regulated to an appropriate extent and that, in the second region, revolutions of the turbine are changed in association with a change of the running gear ratio so that the change in the turbine revolution is required to be adjusted to an appropriate level.

Although a manner in which the torque of the output shaft and the running gear ratio vary during the course of shifting speed ranges is also changed, as have been described hereinabove, it is further understood that they vary with various other factors such as oil temperature. It is thus found difficult to adjust a variation in the torque of the output shaft and the turbine revolutions to an appropriate extent in the course of shifting merely by adjusting a time required for the shifting, as with conventional transmission disclosed in the above patent publication.

SUMMARY OF THE INVENTION

Therefore, the present invention has the object to provide a shift control apparatus and a shift control method for an automatic transmission adapted to enable an appropriate adjustment of a variation in torque and number of revolutions during the period of shifting and permit a smooth shifting by preventing a sufficient degree of shift shock and so on.

In order to achieve the object, in one aspect the present invention consists of a shift control apparatus of an automatic transmission adapted to shift speed ranges by switching the coupling and the decoupling of a friction coupling element mounted on a transmission mechanism, comprising: a revolution number detecting means for detecting a number of revolutions of an input shaft of the transmission mechanism; a coupling force adjusting means for adjusting coupling force of the friction coupling element; a feed-forward control means for controlling coupling force of the friction coupling element by subjecting the coupling force adjusting means to feed-forward control in accordance with a predetermined characteristic for a predetermined period from the time at which a signal of instruction for shifting is received; and a feed-back control means for controlling the coupling force of the friction coupling element by subjecting the coupling force adjusting means to feed-back control on the basis of a variation in revolution number to be detected by the revolution number detecting means after the predetermined period elapses.

The shift control apparatus according to the present invention has preferably the construction consisting of a revolution number detecting means for detecting a number of revolutions of an input shaft of the transmission mechanism; a coupling force adjusting means for adjusting coupling force of the friction coupling element; a feed-forward control means for subjecting the coupling force adjusting means to feed-forward control in accordance with a control value characteristic set so as to vary the control value from a predetermined initial value at a constant change rate during a predetermined period from a signal of instruction for shifting; and a feed-back control means for aubjecting the coupling force means to feed-back control after the predetermined period elapses; the feed-back control means comprises a target change rate determining means for determing a target change rate of number of revolutions in the feed-back control on the basis of an amount of change in the number of revolutions of the input shaft to be estimated by shifting and on the basis of a set time in which the feed-back control is executed; a target revolution number determining means for determining a target number of revolutions per each control cycles on the basis of the target change rate, the control cycles being obtainable by dividing the set time into plural portions; and a control value determining means for determining a control value for the coupling force adjusting means on the basis of a comparison of the number of revolutions detected by the revolution number detecting means with the target number of revolutions.

If a plurality of friction coupling elements are switched in the course of shifting, the shift control apparatus may have the construction, as shown in FIG. 28 as a block diagram, which further comprises the feed-back control means for controlling coupling force of the one friction coupling element so as to allow a number of revolutions detected by the revolution number detecting means to amount to a target number of revolutions set on the basis of a given condition; the second feed-forward control means for controlling a number of revolutions of the input shaft so as to vary with a given target change rate; as well as a difference detecting means and a correction means, the difference detecting means being for detecting a difference between a change rate of the number of revolutions detected by the revolution number detecting means and the target change rate thereof and the correction means being for correcting the target change rate on the basis of the difference detected by the difference detecting means.

In order to achieve the object, in another aspect the present invention consists of a shift control method for an automatic transmission adapted to shift speed ranges by switching the coupling and the decoupling of a friction coupling element mounted on a transmission mechanism, comprising the steps of subjecting coupling force of the friction coupling element to feed-forward control in accordance with a predetermined condition for a predetermined period from a signal of instruction for shifting; and subjecting coupling force of the friction coupling element to feed-back control on the basis of a variation in actual numbers of revolutions of an input shaft in the transmission mechanism after the predetermined period elapses.

The shift control method according to the present invention has the preferred combination of the steps of subjecting coupling force of the friction coupling element to feed-forward control in accordance with a control characteristic so as to vary a control value from an initial value at a constant change rate for a predetermined period from a signal of instruction for shifting; and subjecting coupling force of the friction coupling element to feed-back control after the predetermined period elapses in such a manner that a final control value for the feed-back control is determined by determining a target change rate of a number of revolutions in the feed-back control on the basis of an amount of change in numbers of revolutions of an input shaft of the transmission mechanism estimated by shifting; by determing a target number of revolutions for each of plural control cycles obtainable by dividing the set time into plural portions on the basis of the target change rate; and by determining the final control value for each of the control cycles on the basis of a comparison of an actual number of revolutions of the input shaft and the target number of revolutions.

BRIEF DESCRIPTION OF THE DRAWINGS

FIGS. 22A to 27B are flowcharts showing other examples of the present invention, in which FIGS. 22A to 22G are views showing maps for a variety of values to be stored in the control unit; and FIGS. 23 to 27B are flowcharts showing the detail of control.

DETAILED DESCRIPTION OF THE PREFERRED EMBODIMENTS

The present invention will be described by way of examples in conjunction with the drawings.

Basic Structure of Automatic Transmission

Figure 1:
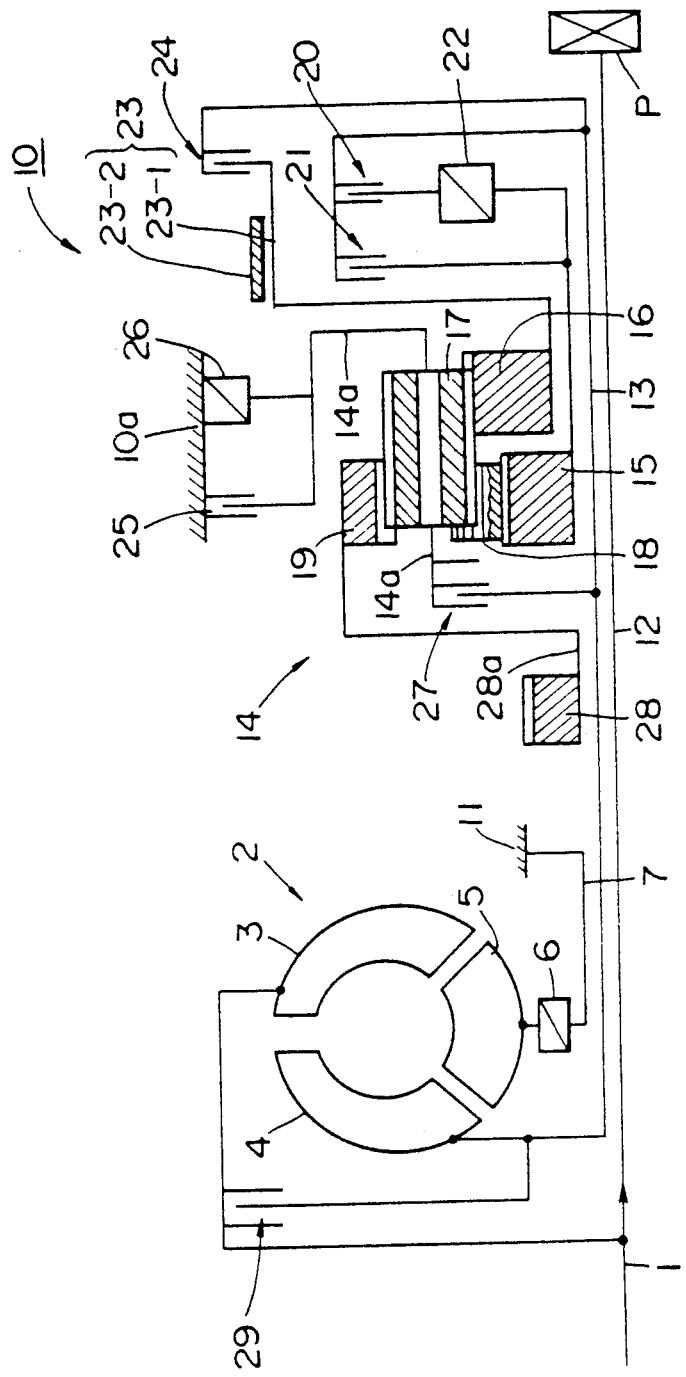
FIG. 1 is a skeletonal structure view showing one example of an automatic transmission consisting of a torque converter and a multi-stage transmission gear mechanism.

FIG. 1 is a skeletonal structural view showing a simplified embodiment of an automatic transmission according to the present invention, in which an oil pressure control apparatus is assembled.

Referring to FIG. 1, reference numeral 1 stands for a crankshaft of an engine (not shown) as an input shaft, and a torque converter 2 and a multi-stage transmission gear apparatus 10 as a transmission mechanism are disposed coaxially with the crankshaft 1 in such a manner that the torque converter 2 is disposed close to the engine. The torque converter 2 comprises a pump 3, a turbine 4, and a stator 5. The pump 3 is fixed to the crankshaft 1, and the stator 5 is rotatable on a fixed shaft 7 disposed integrally with a casing 11 of the multi-stage transmission gear apparatus 10 through a one-way clutch 6 which in turn allows the stator 5 to be rotatable only in a direction in which the pump 3 rotates, but it does not allow a rotation in a reverse direction.

The multi-stage transmission gear apparatus 10 is provided with a central shaft 12 connected to an oil pump P disposed on a side wall of the apparatus. The central shaft 12 is disposed such that a base end thereof is fixed to the crankshaft 1 and a tip end thereof extends axially through a central portion of the apparatus 10, thus driving the pump. Disposed outside the central shaft 12 in a radial direction thereof, namely, in a direction perpendicular to the axis thereof is a hollow turbine shaft 13 which in turn is supported rotatably on a side wall of the multi-stage transmission gear apparatus 10 in such a manner that a base end of the hollow turbine shaft 13 is connected to the turbine 4 of the torque converter 2 and a tip end thereof extends to the side wall of the apparatus 10. On the hollow turbine shaft 13 is provided a planetary gearset unit 14 that comprises a small-diameter sun gear 15, a large-diameter sun gear 16 disposed on a side of the small-diameter sun gear 15 away from the engine, a short pinion gear 18, and a ring gear 19.

On a side of the planetary gearset unit 14 away from the engine are disposed a forward clutch 20 and a coast clutch 21 which are arranged in parallel to each other. The forward clutch 20 is a clutch for forward driving and is designed so as to connect or disconnect power transmission between the small-diameter sun gear 15 and the turbine shaft 13 through a first one-way clutch 22. The coast clutch 21 is arranged in parallel to the forward clutch 20 and is designed so as to connect or disconnect power transmission between the small-diameter sun gear 15 and the turbine shaft 13. Disposed in a radial direction outside the coast clutch 21 is a 2-4 brake 23 that consists of a band brake and comprises a brake drum 23-1 connected to the large-diameter sun gear 16 and a brake band 23-2 belting the brake drum 23-1. Outside the forward clutch 20 in a radial direction thereof and on a side of the 2-4 brake 23 is disposed a reverse clutch 24 which is a clutch for reverse driving and is designed so as to connect or disconnect power transmission between the large-diameter sun gear 16 and the turbine shaft 13 through the brake-drum 23-1 of the 2-4 brake 23.

Disposed in a radial direction outside of the planetary gearset unit 14 is a low-reverse brake 25 for engaging or disengaging a carrier 14a of the planetary gearset unit 14 with or from the casing 11 of the multi-stage transmission gear apparatus 10. Disposed between the 2-4 brake 23 and the low-reverse brake 25 in parallel to the low-reverse brake 25 is a second one-way clutch 26 for engaging or disengaging the carrier 14a with or from the casing 11 of the apparatus 10. On a side of the planetary gearset unit 14 close to the engine is disposed a 3-4 clutch 27 for connecting or disconnecting power transmission between the carrier 14a of the planetary gearset unit 14 and the turbine shaft 13. Disposed on a side of the 3-4 clutch 27 close to the engine is an output gear 28 which in turn is connected to the ring gear 19 and mounted on an output shaft 28a. As shown in FIG. 1, reference numeral 29 stands for a lockup clutch for connecting the turbine shaft 13 directly to the crankshaft 1 without an interposition of the torque converter 2.

Mechanism of the Multi-stage Transmission Gear Apparatus 10

The multi-stage transmission gear apparatus 10 having the structure as have been described hereinabove is designed so as to provide four speed ranges for forward driving and one speed range for reverse driving and a desired speed range can be provided by appropriately operating each of the clutches 20, 21, 24, and 27 and each of the brakes 23 and 25. With the above structure, Table 1 below indicates the relationship of each of speed ranges with operation of the clutches and the brakes.

It is noted herein that only an actuator 23A for the 2-4 brake 23 is provided with two oil chambers on an apply side and a release side. The 2-4 brake 23 is designed capable of coupling only when oil pressure is supplied to the oil chamber of the actuator 23A on the apply side and oil pressure is released from the oil chamber on the release side while it is uncoupled or released in all the other manner of supplying and releasing oil pressures. The rest of the actuators for the clutches and brake is provided each with only one oil chamber designed so as to be coupled when oil pressure is supplied thereto and released or uncoupled when it is released therefrom.

TABLE

| Range Positions & Speed Ranges | | Clutches | | | | Brakes | | | One-Way Clutch | |
|---|---|---|---|---|---|---|---|---|---|---|
| | | Forward (20) | Coast (21) | 3-4 (27) | Reverse (24) | 2-4 (23) | | Low-Reverse (25) | First (22) | Second (26) |
| | | | | | | Apply | Release | | | |
| P | — | | | | | | | | | |
| R | — | | | | O | | | O | | |
| N | — | | | | | | O | | O | O |
| D | 1st Range | O | | | | | | | O | |
| | 2nd Range | O | O | | | O | | | O | |
| | 3rd Range | O | O | O | | ∆ | O | | ∆ | |
| | 4th Range | O | | O | | O | | | | |
| 2 | 1st Range | O | | | | | O | | O | O |
| | 2nd Range | O | O | | | O | | | O | |
| | 3rd Range | O | O | O | | ∆ | O | O | O | |
| 1 | 1st Range | O | O | | | | | O | O | |
| | 2nd Range | O | O | | | O | | | | |

Note:
The symbol O marks the state of being coupled.
The symbol ∆ marks the state in which it is operated but no power transmission is involved.

Outline of Oil Pressure Circuits

An outline of oil pressure circuits assembled in the automatic transmission as shown in FIG. 1 will be described in conjunction with FIG. 2.

Manual Valve

Figure 2:
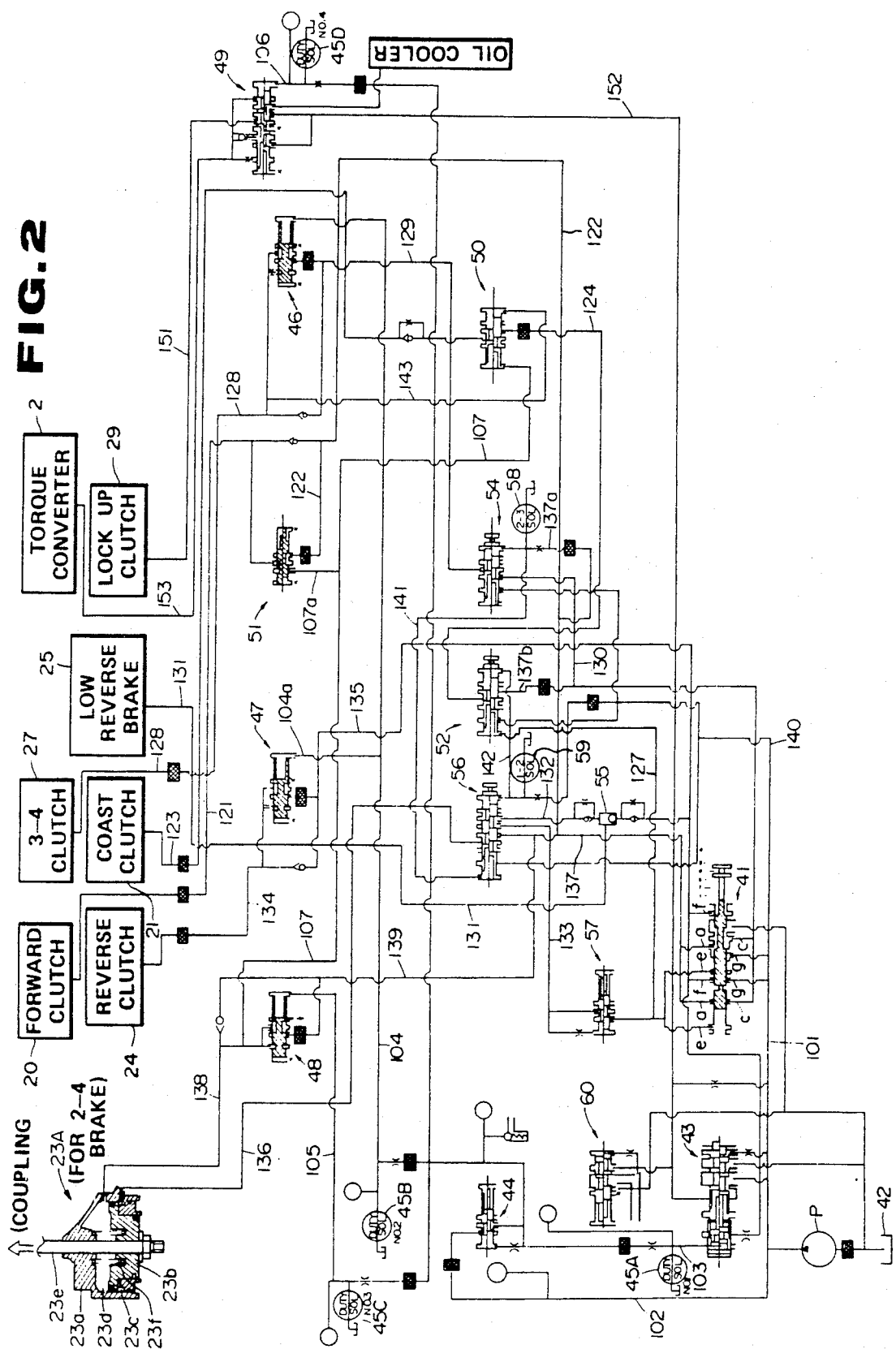
FIG. 2 is a diagram showing an example of oil pressure circuits for the automatic transmission of FIG. 1.

Referring to FIG. 2, a manual valve 41 is shown to take six speed range positions "P", "R", "N", "D", "2" and "1" in accordance with manual operation and it is provided with ports a, c, e, f and g.

Oil pressure generated by oil pumped by the pump P from an oil reservoir tank 42 is regulated by a pressure regulator valve 43 connected to an oil passage 101, thus feeding line pressure to the ports g. It is noted that, when the manual valve 41 provides the speed range position "P", no port is communicated with the ports g, whereby no line pressure is supplied; only the ports f are communicated with the ports g at the speed range position "R"; no port is communicated therewith at the speed range position "N"; the ports a and c are communicated with the ports g at the speed range position "D"; the ports a and c with the ports g at the speed range position "2"; and the ports a and e with the ports g at the speed range position "1".

Duty Solenoid Valves

Oil pressure generated by oil pumped by the pump P is reduced by a solenoid reducing valve 44 to a predetermined pressure through an oil passage 102. The reduced oil pressure is then regulated by first, second, third and fourth duty solenoid valves 45A, 45B, 45C and 45D, respectively. In the specification which follows and the drawings, the duty solenoid valve will sometimes be referred to as DSL.

The oil pressure regulated by the first duty solenoid valve 45A is supplied through an oil passage 103 to the pressure regulator valve 43 as a pilot pressure. The oil pressure regulated by the second duty solenoid valve 45B is supplied through an oil passage 104 to a 3-4 pressure control valve 46 as a pilot pressure and furthermore to a reverse pressure control valve 47 as a pilot pressure through a branch oil passage 104a branched from the oil passage 104. The oil pressure regulated by the third duty solenoid valve 45C is fed through an oil passage 105 to a servo pressure control valve 48 as a pilot pressure. The oil pressure regulated by the fourth duty solenoid valve 45D is fed through an oil passage 106 to a lockup control valve 49 as a pilot pressure.

The servo pressure control valve 48 regulates the oil pressure to be released from a release oil chamber of the actuator 23A for the 2-4 brake 23 through an oil passage 138. The oil pressure released from the release oil chamber thereof and regulated by the servo pressure control valve 48 is then fed through an oil passage 107 to a coast control valve 50 as a pilot pressure. The third duty solenoid valve 45C accordingly serves as adjusting both the pilot pressure of the servo pressure control valve 48 itself and the pilot pressure for the coast control valve 50. A portion of the oil pressure released from the release oil chamber of the actuator 23A of the 2-4 brake 23 and regulated by the servo pressure control valve 48 side thereof is fed as a forward clutch pressure to be switched or shifted by a forward control valve 51 through a branch oil passage 107a branched from the oil passage 51. The oil pressure is switched or shifted between the oil passage 107 and the branch oil passage 107a by the forward control valve 51 in a manner as will be described below.

Actuators for Clutches and Brakes

Referring to FIG. 2, it is noted that actuators for the cltuches and the brake other than the 2-3 brake 23 are of the type capable of being coupled merely when oil pressure is fed so that the repective actuators are provided with the same reference numerals as the corresponding clutches and the brake.

As have been briefly described hereinabove, unlike the other clutches and the brake, the actuator 23A for the 2-4 brake 23 is provided with two oil chambers by dividing its cylinder 23a with a piston 23b, one being an apply oil chamber 23c for applying oil pressure thereto and the other being a release oil chamber 23d for releasing oil pressure therefrom. The piston 23b is integral with a piston rod 23e connected to the band 23-2 of the 2-4 brake 23 and is urged by a spring 23f connected to the cylinder 23a in a downward direction as seen in FIG. 2.

The actuator 23A is designed so as to be coupled with the 2-4 brake 23 only when the line pressure is fed to the apply oil chamber 23a of the 2-4 brake 23 and the oil pressure is released from the release oil chamber 23d thereof. In other words, as long as the oil pressure is supplied to the release oil chamber 23d, even if the line pressure is fed to the apply oil chamber 23c, the 2-3 brake 23 is kept open so that the actuator 23A thereof cannot be coupled with the 2-3 brake 23. And a coupling force of the 2-4 brake 23 is to be adjusted by regulating the oil pressure of the release oil chamber 23d by the servo pressure control valve 48 using the third duty solenoid valve 45C.

Communication of Actuators for Friction Coupling Elements with Manual Valve

An actuator for the forward clutch 20 is communicated with the ports a of the manual valve 41 via connection through an oil passage 121 to the forward control valve 51 which in turn is connected through an oil passage 122 to the manual valve 41.

An actuator of the coast clutch 21 is communicated with the ports a of the manual valve 41 by means of connection through an oil passage 123 to the coast control valve 50 which in turn is connected through oil passage 124 to a coast exhaust valve 52 connecting further through oil passages 122 and 137 to the manual valve 41.

An actuator for the 3-4 clutch 27 is communicated with the ports c of the manual valve 41 by means of connection through an oil passage 128 to the 3-4 pressure control valve 46 which in turn is connected through an oil passage 129 to a 2-3 shift valve 54 connected further to the manual valve 41 through an oil passage 130.

An actuator for the low-reverse brake 25 is communicated with the ports f of the manual valve 41 by means of connection to the manual valve 41 through an oil passage 131 via a shift valve 55. An oil passage 132 switched from the oil passage 131 of the low-reverse brake 25 by the shift valve 55 is connected to a 1-2 shift valve 56 which in turn is communicated with the ports e of the manual valve 41 through an oil passage 133 and a low-reducing valve 57.

An actuator for the low-reverse clutch 24 is communicated with the ports f of the manual valve 41 via connection through an oil passage 134 to the reverse pressure control valve 47 which in turn connected to the manual valve 41 through an oil passage 135.

For the actuator 23A of the 2-3 brake 23, the apply oil chamber 23c is communicated with the ports a of the manual valve 41 in such a manner that it is connected through an oil passage 136 to a 1-2 shift valve 56 which is further connected to the manual valve 41 through an oil passage 137, on the one hand, and the release oil chamber 23d is also communicated with the ports a thereof in such a manner that it is connected through the oil passage 138 to the servo pressure control valve 48 leading further to the manual valve 41 through oil pressures 139 and 137, on the other hand. The oil pressure in the release oil chamber 23d is further supplied to the coast control valve 50 through the oil passage 107, on the one hand, and to the forward control valve 51 through the oil passage 107a, on the other hand.

Shift Valves 54 And 56

The 2-3 shift valve 54 regulates a supply or a release of a pilot pressure by turning the 2-3 solenoid 58 on or off. The pilot pressure to be regulated by the 2-3 shift solenoid 58 is determined by supplying an oil pressure from a branch oil passage 137a, as it is, to the 2-3 shift valve 54 or draining the oil pressure, the branch oil passage 137a being branched from the oil passage 137 extending from the ports "a" of the manual valve 41. The oil pressure is drained when the 1-2 solenoid 58 is turned on.

The 1-2 shift valve 56 regulates a supply or a release of a pilot pressure by the 1-2 solenoid 59. As the pilot pressure to be regulated by the 1-2 solenoid 59 is employed a line pressure from the oil passage 140 bypassing the manual valve 41. When the 1-2 solenoid 59 is turned on, the line pressure is drained to release the pilot pressure. The pilot pressure for the 1-2 shift valve 56 also contains a pilot pressure to be regulated for the 2-3 shift valve 54. That is, the pilot pressure regulated by the 2-3 solenoid 58 also acts as a pilot pressure on the 1-2 shift valve 56 through an oil passage 141.

The 1-2 shift valve 56 is operated by the pilot pressures regulated by the solenoids 58 and 59. Given the pilot pressure to be regulated by the 2-3 solenoid 58 being zero, that is, being drained as the 2-3 solenoid 58 is turned on, the 1-2 shift valve 56 is displaced to left in the drawings to communicate the oil passage 137 with the oil passage 136, when the 1-2 solenoid 59 is turned on and the pilot pressure is converted into a line pressure, thus enabling a supply of the line pressure to the apply side oil chamber 23c of the 2-4 brake actuator 23A. On the contrary, when the 2-3 solenoid 58 is turned off and the pilot pressure for the 2-3 shift valve 54 is converted into line pressure, the resulting line pressure acts on the 1-2 shift valve 56 which in turn is displaced to right in the drawings in order to block the oil passages 137 and 136, regardless of ON/OFF operation of the 1-2 solenoid 59.

Coast Exhaust Valve 52

As a pilot pressure for the coast exhaust valve 52 is used a pilot pressure regulated by the 1-2 solenoid 59. To the coast exhaust valve 52 functioning as a shift valve is further supplied an original pressure (line pressure) from the ports "e" of the manual valve 41, which is generated only when the manual valve 41 is at the speed range position "1". The original pressure therefrom is fed as a pilot pressure through the oil passage 127.

This arrangement permits the coast exhaust valve 52 to be shifted to a state in which an oil pressure can be supplied for coupling the coast clutch 21 by receiving the pilot pressure regulated by the solenoid 59 for the 1-2 shift valve 56 at the second and third speed ranges in the speed range position "D", at the second and third speed ranges in the speed range position "2", and at the second speed range in the speed range position "1". In addition, the coast exhaust valve 52 is shifted to a state in which an oil pressure can be supplied for coupling the coast clutch 21 in response to the original pressure supplied as a pilot pressure from the ports "e" of the select valve 41 at the first speed range in the speed range position "1".

As have been described hereinabove, in this embodiment, a first drive range is the "D" range and the "2" range, and a second drive range is the "1" range. If the speed stage is the same, a speed range in which the coast clutch 21 is in a state being operable or inoperable is the first speed range, as have been shown in Table 1 above.

Table 2 below indicates the relationships of the speed range positions and speed ranges with states of operation of the solenoid 58 and 59. It is noted herein that both the solenoid valves 58 and 59 can be turned off in the fourth speed range in the speed range position "D".

TABLE 2

| Range Positions & Speed Ranges | | 1-2 Solenoid (59) | 2-3 Solenoid (58) |
|---|---|---|---|
| P | | | O |
| R | | O | |
| N | | | O |
| | | O | |
| D | 1ST | | O |
| | 2ND | O | O |
| | 3RD | O | |
| | 4TH | | |
| 2 | 1ST | | O |
| | 2ND | O | O |
| | 3RD | O | |
| 1 | 1ST | | O |
| | 2ND | O | O |

Note: The symbol O means that the solenoid is turned on (drained).

Lockup Clutch 29

The lockup clutch 29 is arranged such that it is at a stationary time in a state of being coupled by receiving a pressure from the torque converter 2 and that it is uncoupled when an oil pressure is introduced into the lockup clutch 29. The lockup clutch 29 is connected through an oil passage 151 to the lockup control valve 49 which in turn is communicated through an oil passage 152 with the line pressure passage 101 bypassing the manual valve 41. This structure permits controlling a connection or disconnection of the lockup clutch 29 or a connection thereof in a halfway state by regulating the pilot pressure of the lockup control valve 49.

Torque Converter 2

The torque converter 2 is communicated through an oil passage 153 with the lockup control valve 49 which in turn is connected to a converter relief valve 60 through the oil passage 152, thus permitting a pressure in the torque converter 2 to be maintained always constant at the oil passage 152.

Operation Of Valves In The Oil Pressure Circuits

Shift Valves: Shifting the speed ranges in each of the speed range positions "D", "1" and "2" is effected basically by way of an appropriate ON/OFF operation of the shift valves 58 and 59 as have been indicated in Table 2 above. More specifically, engagement and disengagement of the 2-4 brake 23 is regulated, as shown in Table 1 above, by controlling an application or release of the oil pressure to or from the apply side oil chamber 23c of the actuator 23A for the 2-4 brake 23 by means of the 1-2 shift valve 56 via the 1-2 solenoid or by controlling an application or release of the oil pressure to or from the release side oil chamber 23d thereof by means of the third duty solenoid 45C.

A control of an application or a release of the oil pressure to or from the 3-4 clutch 27 by means of the 2-3 shift valve 54 via the 2-3 solenoid 58 permits a regulation of coupling and uncoupling of the 3-4 clutch 27 as shown in Table 1 above.

Low Reducing Valve 57: During the speed range position "1", the low reducing valve 57 regulates the oil pressure for coupling the low reducing valve 57 to be maintained at a constant low level.

Reverse Pressure Control Valve 47: At the time when the speed range is selected from the position "N" to the position "D", the pilot pressure for the reverse pressure control valve 47 is regulated by the second duty solenoid 45B so that the oil pressure for coupling the reverse clutch 24 is regulated to thereby reduce a shock to be caused at that time.

Coast Control Valve 50: This coast control valve 50 is to secure a release of the coast clutch 21 during the fourth speed range. As the pilot pressure for the coast control valve 50 may be used the oil pressure for coupling the 3-4 clutch 27 to be supplied through the oil passage 143 as well as the oil pressure released from the release side oil chamber 23d of the 2-4 brake actuator 23A. This arrangement permits the 3-4 clutch 27 to be coupled or engaged and the coast control valve 50 to release the coupling pressure for the coast clutch 21 from the coast control valve 50 by receiving the oil pressure for coupling the 3-4 clutch 27 because the oil pressure in the release side oil chamber 23d thereof is released at the time of the fourth speed range where the 2-4 brake 23 is coupled. This prevents an internal lock of the planetary gearset unit 14, which may be caused where the 3-4 clutch 27 and the 2-4 brake 23 are coupled. The oil pressure for coupling the 3-4 clutch 27 with the 2-4 brake 23 is used as the pilot pressure for the coast control valve 50, so that an internal lock at the fourth speed range can be prevented for sure. This arrangement is also effective as a fail safe function for prevention of an internal lock that might be caused in a case where a manner of actually supplying an oil pressure fails to correspond to a shift signal when the shift valves 58 and 59 are both turned on during the fourth speed range.

Coast Exhaust Valve 52: A basic engagement and disengagement of the coast exhaust valve 52 is controlled by the pilot pressure regulated by the 1-2 solenoid 59 and by the original pressure from the ports "e" of the manual valve 41 as pilot pressure as indicated in Tables 1 and 2 above.

The coast exhaust valve 52 ensures a prevention of the internal lock that may temporarily occur at a timing of operation of the 3-4 clutch 27 and the 2-4 brake 23 at the time of upshifting from the second speed range to the third speed range. While the 2-3 shift solenoid 58 is turned off to convert the pilot pressure into line pressure and the 1-2 shift valve 56 is held at the second speed range, the coast exhaust valve 52 is turned on to convert the pilot pressure into line pressure by the pilot pressure (line pressure) of the 1-2 solenoid 59, releasing the oil pressure for coupling the coast clutch 21. Of course, this operation works in the midway of upshifting from the second speed range to the third speed range. After the upshifting to the 3rd speed range is finished, the coast clutch 21 is coupled or engaged again by turning the 1-2 solenoid on. A manner of this regulation will be described in detail hereinbelow.

Forward Control Valve 51: At the time of shift in the speed range from the range position "N" to the range position "D", the servo pressure control valve 48 is regulated by the third duty solenoid 45C to adjust the oil pressure of the oil passage 107 and the branch oil passage 107a. If the oil pressure of the oil passage 107a does not reach a predetermined oil pressure, on the one hand, the forward control valve 51 is operated to supply an oil pressure to the forward clutch 20 so as to allow the oil passage 107a to reach the predetermined oil pressure. If the oil pressure of the branch oil passage 107a exceeds the predetermined oil pressure, on the other hand, the line pressure from the oil pressure 122 is supplied to the forward clutch 20 as it is. This arrangement reduces a shock at the time of shifting from the N range to the D range.

3-4 Pressure Control Valve 46: At the time of upshifting from the second speed range to the third speed range, the 3-4 clutch 27 is coupled at an appropriate pressure in order to prevent a transmission shock or a shock caused at the time of shifting the speed ranges. This coupling is effected at an appropriate timing of releasing the 2-4 brake 23 by adjusting the pilot pressure by the second duty solenoid valve 45B.

At the time of downshifting from the third speed range to the second speed range, the oil pressure for coupling the 3-4 clutch 27 is released at an appropriate timing of coupling or engaging the 2-4 brake 23 by regulating the pilot pressure by means of the second duty solenoid 45B in order to prevent a shock to be caused at the time of the downshifting.

Servo Pressure Control Valve 48: Regulation of the pilot pressure by means of the third duty solenoid valve 45C permits an adjustment of the oil pressure in the release side oil chamber 23d of the actuator 23A for the 2-4 brake 23 and an adjustment of the oil pressure for coupling the forward clutch 20. The above description on the forward control valve 51 in this section of the specification is incorporated as reference hereto. When the first speed range is upshifted to the second speed range, the oil pressure for coupling is supplied to the apply side oil chamber 23c in the 2-4 brake actuator 23A by the 1-2 shift valve 56. At this time, a transmission shock can be reduced by adjustment of the oil pressure in the release side oil chamber 23d thereof.

At the time of upshifting from the second speed range to the third speed range, the oil pressure for releasing is eventually fed to the release side oil chamber 23d of the 2-4 brake actuator 23A at a timing of coupling or engaging the 3-4 clutch 27 while adjusting the pressure in the release side oil chamber 23d thereof. This prevents a shock that may be caused at the time of upshifting from the second to the third speed range. That is, although the oil pressure for coupling is supplied to the apply side oil chamber 23c thereof at both the second and third speed ranges, the coupling or engagement and the uncoupling or disengagement of the 2-4 brake 23A is switched by shifting a supply and a release of the oil pressure to and from the release side oil chamber 23d thereof. Regulating the oil pressure to be fed to the release side oil chamber 23d thereof by the servo pressure control valve 48 permits a gradual engagement of the 2-4 brake 23, thus preventing a transmission shock which otherwise may be caused at the time of shifting the speed ranges.

At the time of downshifting from the third speed range to the second speed range, while the oil pressure in the release side oil chamber 23d is adjusted, the oil pressure is eventually released to engage the 2-4 brake 23 at an appropriate timing of releasing the 3-4 clutch 27.

At the time of shifting between the second speed range and the third speed range, the 3-4 clutch 27 and the 2-4 clutch 23 are shifted between a coupled or engaged state and an uncoupled or disengaged state. At this time, shifting the speed ranges is conveniently effected via a temporary state of the first speed range as the lowest speed range while the coast clutch 21 is uncoupled or disengaged. This can effectively prevent a transmission shock that might be caused at that time.

This will be set forth more in detail on condition that the coast clutch 21 is coupled in the course of shifting between the second speed range and the third speed range. At the time of downshifting from the third speed range to the second range, on the one hand, the fourth speed range is temporarily established causing a shock on account of an internal lock if the timing of coupling the 2-4 brake 23 were too early. When the upshifting from the second speed range to the third speed range is in the progress, on the other hand, if the timing of coupling the 3-4 clutch 27 were too early, the fourth speed range is temporarily established in this case, too, causing a shock to arise from an internal lock. Accordingly, if the coast clutch 21 were uncoupled at the time of shifting between the second and third speed ranges prior to the coupling or uncoupling of the 2-4 brake 23 and the 3-4 clutch 27, a shock on account of such an internal shock can be effectively prevented.

Even if the coast clutch 21 were disengaged during the time of shifting between the second and third speed ranges, a temporary state of the 4th speed range as have been set forth hereinabove could be caused to arise. In this case, no shock will be caused on account of an internal lock because of the disengagement of the coast clutch 21, but there is the possibility that a shock could be caused to occur by engine braking. This is because, when the fourth speed range is established temporarily, the number of revolutions of the engine, viz., of the turbine shaft 13 as an input shaft of the automatic transmission becomes extremely larger than that on the drive shaft side, viz., on the side of the output shaft 28, so that an engine braking action develops, reducing the number of revolutions of the engine, thus causing a shock. Such an engine braking action can be prevented if a state of the first speed range could be established in order to take the reverse relationship as performed by the fourth speed range, that is, in such a manner as the number of revolutions on the input shaft side being smaller than that on the output shaft.

Figure 3:
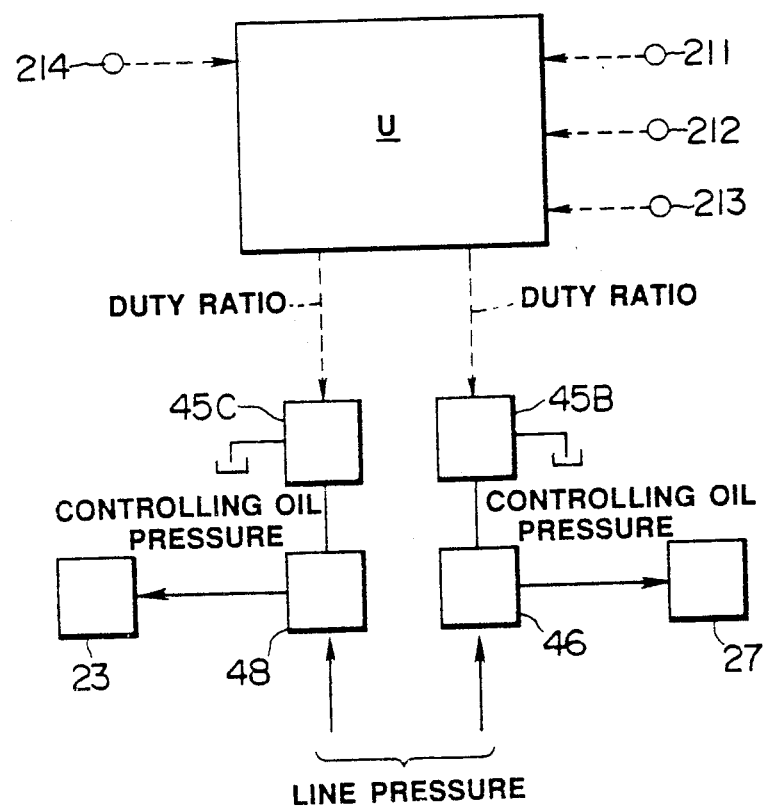
FIG. 3 is a diagram showing a control system applicable to the present invention.

A detailed description on the control at the shifting between the second speed range and the third speed range will be made with reference to the flowcharts indicated in FIGS. 3 and 4. Although shift control is designed to be made by means of a microcomputer in this embodiment, it is known to use such a microcomputer for controlling the shifting of the speed stages so that a description on the detail a system for the shift control will be omitted below.

SHIFT CONTROL

In order to prevent shift shock at the time of shifting speed ranges, a number of revolutions of the turbine is controlled at a given change rate by adjusting force for coupling the 2-4 brake 23 and the 3-4 clutch 27 by the second and third duty solenoid valves 45B and 45C—by means of duty control against the respective duty solenoid valves 45B and 45C.

The control during the time of shifting may be made using a control unit U consisting of a microcomputer. As shown in FIG. 3, the control unit U are supplied with signals from sensors 211 to 214, inclusive, and give output signals to the second and third duty solenoid valves 45B and 45C. The sensor 211 is designed to sense a degree of throttle opening; the sensor 212 to sense a vehicle speed; the sensor 213 to sense a number of revolutions of the turbine; and the sensor 214 to sense an oil temperature. The control unit U comprises basically a CPU, a ROM, a RAM, a CLOCK an input/output interface, and an A/D converter. These parts are known ones for the microcomputer so that a further description thereon is omitted.

Figure 4:
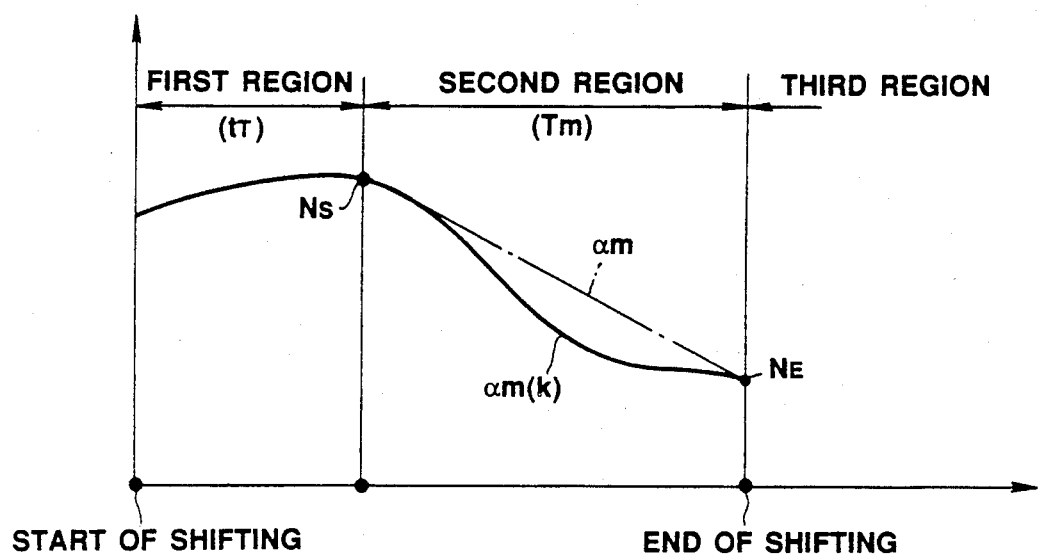
FIG. 4 is a view showing first, second, and third regions in the course of shifting as well as a manner of variation in numbers of turbine revolutions.

As shown in FIG. 4, the shift control is executed in three regions, the first region (a control region) being a period of time ranging from the start of shifting to the time when a number of revolutions of the turbine starts changing in response to a signal for instruction of shifting, the second region (a control region) being a period of time ranging from the start of changing the number of revolutions of the turbine to the end of shifting, and the third region (a control region) being a period of time after the end of shifting. It is to be understood that a manner of shifting is intended herein to mean the shifting from one speed range to another, for instance, within four speed ranges ranging the first to fourth speed stages, as will be described hereinbelow—for example, from the first speed range to the second speed range or from the first speed range to the third speed range.

It is thus to be noted that the first region is a region where a number of revolutions of the turbine little varies on account of the idling of the brakes and clutches so that it may be called a region for preparation for shifting. At this time, a duty ratio against the duty solenoid valves 45B and 45C is subjected to feed-forward control for a predetermined set time as will be shown in Table 3 below.

The second region is a region where the number of revolutions of the turbine varies to a substantially large extent so that it may be called a virtually shifting region. In the second region, a predetermined set time is set and the set time is divided into a plurality of equally divided control cycles. In each of the control cycles, the duty control solenoid valves 45B and 45C are as a rule subjected to feed-back control. It is to be noted, however, that one of the duty solenoid valves 45B and 45C is feed-back controlled while the other is feed-forward controlled when both the 2-4 brake 23 and the 3-4 clutch 27 are operative and switched. This is because there can be prevented an interference of one of the duty solenoid valves 45B and 45C with the other, which otherwise may occur when they are both subjected to feed-back control. Accordingly, it is decided in advance, in accordance with the manner of shifting, which of the duty solenoid valves 45B and 45C should be feed-back controlled so as to prevent shift shock.

The third region is a region where the shifting is post-processed. In this third region, no duty control of the duty solenoid valves 45B and 45C is required any more for prevention of shift shock so that the duty ratio is set at 0% or at 100% in accordance with operation relationships as have been shown in Table 2 above. In other words, the duty solenoid valve concerned is turned off as the duty ratio is set at 0% while it is turned on as the duty ratio is set at 100%. It is to be noted herein that the third region is further processed for providing a learning value because a learning control is executed in both the first region and the second region.

Control patterns for the duty solenoid valves 45B and 45C in the first region control and in the second region control will be shown in Tables 3 and 4, respectively. It is to be understood that, in the tables below, reference symbol "IC" is intended to mean an increase in the duty ratio, and reference symbol "DC" is to mean a decrease in the duty ratio. In Table 4 below, reference symbol "FF" is intended to mean "feed-forward control" and reference symbol "FB" to mean "feed-back control".

smaller. This is because shift shock should be particularly avoided in many cases during ordinary running when the degree of throttle opening is small. In this embodiment, the control time $t_T$ is predetermined in a unit of every 16 msec and designated in a coefficient to be multiplied by 16 msec. In other words, the set control time $t_T$ represented by 2 equals 32 msec ($2 \times 16$ msec). It is to be noted herein that the predetermined control time $t_T$ is the same at the time of upshifting as at the time of downshifting for brevity of control.

By setting a plurality of control cycles by dividing the set control time $t_T$ into equal parts at every 16 msec, the duty ratio by the feed-forward control in the first region is determined on the basis of the following formula (1):

$$D = Ds \times C_3 + \Delta D \times C_4(t_T - t) \times S \tag{1}$$

where
D stands for a duty ratio per every control cycle;
Ds stands for a learning value (an initial value);
$\Delta D$ stands for a base value;
t stands for a period elapsed from the start of shifting;
$C_3$ stands for a correction coefficient;
$C_4$ stands for a correction coefficient; and

TABLE 3

| BEFORE SHIFT | | AFTER SHIFT | | | |
|---|---|---|---|---|---|
| | | FIRST SPEED RANGE | SECOND SPEED RANGE | THIRD SPEED RANGE | FOURTH SPEED RANGE |
| FIRST SPEED RANGE | DSL 45B | — | ON (100%) | DC | DC |
| | DSL 45C | — | IC | OFF (0%) | OFF (0%) |
| SECOND SPEED RANGE | DSL 45B | ON (100%) | — | DC | DC |
| | DSL 45C | DC | — | DC | ON (100%) |
| THIRD SPEED RANGE | DSL 45B | IC | IC | — | OFF (0%) |
| | DSL 45C | OFF (0%) | IC | — | IC |
| FOURTH SPEED RANGE | DSL 45B | IC | IC | OFF (0%) | — |
| | DSL 45C | ON (100%) | ON (100%) | DC | — |

TABLE 4

| BEFORE SHIFT | | | AFTER SHIFT | | | |
|---|---|---|---|---|---|---|
| | | | FIRST SPEED RANGE | SECOND SPEED RANGE | THIRD SPEED RANGE | FOURTH SPEED RANGE |
| FIRST SPEED RANGE | DSL 45B | FF | — | (100%) | | O DC |
| | | FB | — | | O | |
| | DSL 45C | FF | — | | (0%) | |
| | | FB | — | O | | O |
| SECOND SPEED RANGE | DSL 45B | FF | (100%) | — | | |
| | | FB | | — | O | O |
| | DSL 45C | FF | O DC | — | O DC | (100%) |
| | | FB | | — | | |
| THIRD SPEED RANGE | DSL 45B | FF | O IC | O IC | — | (0%) |
| | | FB | | | — | |
| | DSL 45C | FF | (0%) | | — | |
| | | FB | | O | — | O |
| FOURTH SPEED RANGE | DSL 45B | FF | O IC | | (0%) | — |
| | | FB | | O | | — |
| | DSL 45C | FF | O DC | (100%) | | — |
| | | FB | | | O | — |

First Region Control

Figure 5:
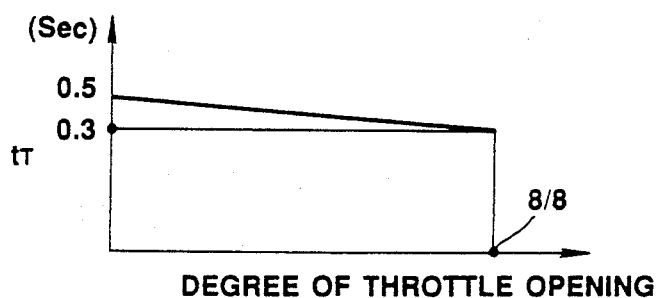
FIG. 5 is a view showing a map for determining a control time $t_T$ for the first region.

A predetermined control time $t_T$ to be set in the first region is designed so as to vary with a degree of throttle opening as shown in FIG. 5. As will be apparent from FIG. 5, the predetermined control time $t_T$ is set to become larger as the degree of throttle opening gets S stands for a coefficient for setting an increase or a decrease in oil pressures.

It should be noted herein that the learning value Ds is determined in the third region as will be described hereinbelow and that, when no learning value is present, an initial value preset in every manner of shifting is used. Furthermore, it should be noted that the initial value is set on the basis of a degree of throttle opening being at 50%.

The correction coefficient $C_3$ for correcting the learning value Ds is set as "1" when the degree of throttle opening is ½, and it is further set in such a manner that it becomes gradually greater as the degree of throttle opening descends from ½ while it becomes gradually smaller as the degree of throttle opening get greater than ½.

The base value $\Delta D$ indicates a base slope of variation in oil pressures and is determined in advance in accordance with speed ranges.

Figure 6:
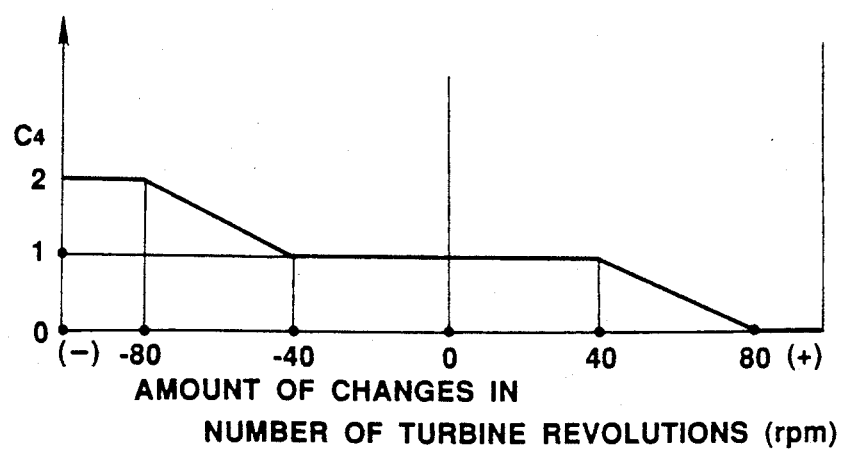
FIG. 6 is a view showing a map for determining a correction coefficient $C_{4a}$.

The correction coefficient $C_4$ for correcting the learning value $\Delta D$ is set in accordance with the magnitude of an amount of changes in numbers of turbine revolutions in the first region, as shown in FIG. 6. In FIG. 6, the amounts of changes in numbers of turbine revolutions are set for every 16 msec—in other words, it is an amount of change in numbers of turbine revolutions per control cycle.

The coefficient S indicates a direction in which the oil pressures are to be increased or decreased. As the oil pressures are increased, the coefficient S is indicated by positive number "+" while, as they are decreased, it is indicated by negative number "−". It is thus to be noted that the coefficient S is the same no matter what the speed ranges are before and after shifting takes place.

The duty ratio D determined by the formula (1) is finally corrected on the basis of oil temperatures and then applied to one or both of the duty solenoid valves 45B and 45C.

As has been described hereinabove, the first region control concludes at the time when the predetermined control time $t_T$ has elapsed.

Second Region Control

Figure 7:
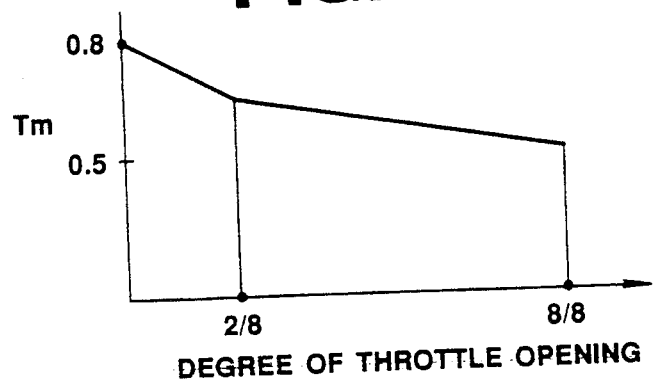
FIG. 7 is a view showing a map for determining a control time Tm for the second region.

For the second region control, a control time Tm is predetermined on the basis of degrees of throttle opening as a parameter as shown in FIG. 7. The control time Tm is set by dividing into equal control cycles in every 16 msec like the set control time $t_T$ for the first region control and designated as a coefficient for multiplication by 16 msec. Thus the set control time Tm indicated by 30 equals 480 msec, namely, 30×16 msec. The control time Tm is likewise the same at the time of upshifting as at the time of downshifting for brevity of control.

(a) Feed-Back Control:

The feed-back control in the second region is executed by renewing a target value for each of control cycles. More specifically, a number of turbine revolutions which will be reached after shifting speed ranges is first computed as a target number of turbine revolutions, $N_E$. The target number of turbine revolutions $N_E$ is computed by the following formula (2):

$$N_E = \frac{N_S \times \text{Gear Ratio After Shifting}}{\text{Gear Ratio Before Shifting}} \quad (2)$$

where $N_S$ stands for an actual number of turbine revolutions prior to the shifting of speed ranges.

Thus a rate at which the target number of turbine revolutions changes, $a_m$, is calculated by the following formula (3):

$$a_m = (N_S - N_E)/Tm \quad (3)$$

Then an amount of change in a target number of turbine revolutions for each control cycle, $a_m(k)$, is calculated by the following formula (4):

$$a_m(k) = a_m \times C_1 \times C_2 \quad (4)$$

where
$a_m(k)$ stands for an amount of change in a target number of turbine revolutions for the k-th control cycle;
$C_1$ stands for a correction coefficient;
$C_2$ stands for a correction coefficient.

Figure 8:
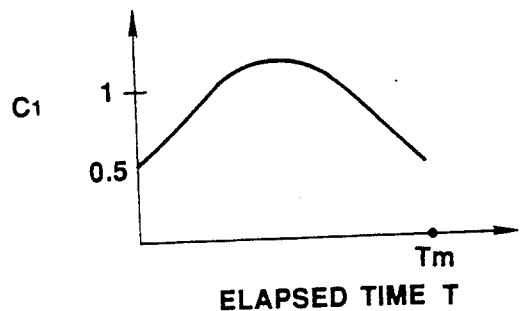
FIG. 8 is a view showing a map for determining a correction coefficient $C_1$.

The correction coefficient $C_1$ is a coefficient for correction in accordance with a time T elapsed from the start of the second region control and is set as shown in FIG. 8. As is apparent from FIG. 8, the correction coefficient $C_1$ is set smaller in initial and latter regions of the time T and it is set larger in the middle region. In other words, an amount of change in target numbers of turbine revolutions, namely, a change rate of numbers of turbine revolutions as will be described more in detail, are designed so as to become larger in the middle region of the time T, namely, in a middle region portion of the second region, than in the regions prior to and subsequent to the middle region thereof.

The correction coefficient $C_2$ is set to be larger as a difference between the actual number of turbine revolutions and the target number of turbine revolutions gets larger. In this embodiment, the correction coefficient $C_2$ is set as "1" when the difference is 140 rpm or more and it is set as descending gradually as the difference becomes smaller than 140 rpm.

For each of the control cycles, a target number of turbine revolutions is determined so as to become the amount of changes in the target number of turbine revolutions, $a_m(k)$, by the following formula (5):

$$N(k) = N(k-1) - a_m(k) \quad (5)$$

where
N(k) stands for a target number of turbine revolutions for the k-th control cycle; and
N(k−1) stands for a target number of turbine revolutions for the (k−1)th control cycle.

Figure 9:
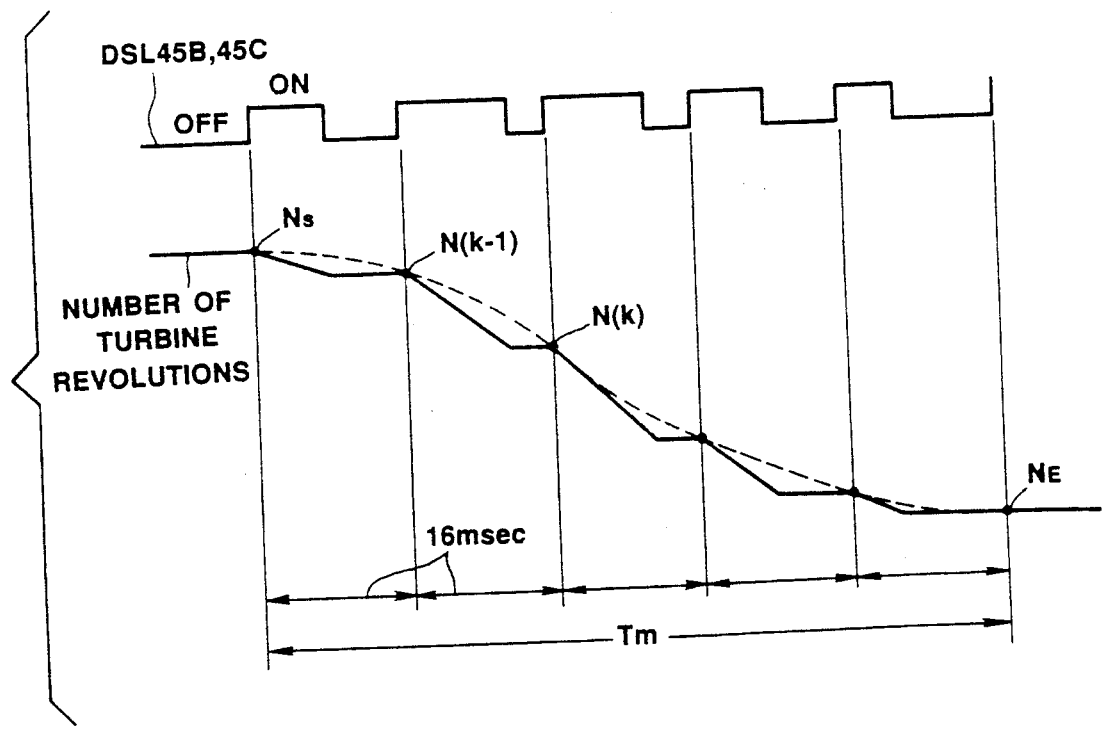
FIG. 9 is a view showing a state of operation of a duty solenoid and a manner of variation in numbers of turbine revolutions in the process of the feed-back control for the second region.

As has been described hereinabove, the target numbers of turbine revolutions, N(k), are determined one by one for the control cycles and a manner of variation in the target numbers of turbine revolutions, N(k), is indicated as relationships with a pulse width to be output to the duty solenoid valve 45B or 45C, as shown in FIG. 9. It is noted that FIG. 9 shows the case in which numbers of turbine revolutions are decreased.

(b) Feed-Forward Control:

In the feed-forward control in the second region, a duty ratio for each of the control cycles is determined by the following formula (6):

$$D(k) = D(k-1) - \Delta D \times C_5 \times S \quad (6)$$

where
D(k) stands for a duty ratio for the k-th control cycle;
D(k−1) stands for a duty ratio for the (k−1)th control cycle;
$\Delta D$ stands for a slope of an amount of change (a base value);
$C_5$ stands for a correction coefficient;

S stands for a coefficient indicative of a direction in which oil pressures are increased or decreased.

If the control cycle is at the first position (k=1), a learning value is used as a duty ratio D(k) as will be described hereinbelow. If there is no learning value, an initial value preset for each of manners of shifting is used in substantially the same manner as in the first region control.

The coefficient S is indicated by "+1" or "−1" as the coefficient S in the formula (1). The slope $\Delta D$ stands for a change rate of numbers of turbine revolutions and is predetermined in accordance with a manner of shifting—for example, upshifting from the first speed range to the second speed range. The correction coefficient $C_5$ is determined on the basis of an amount of changes in numbers of turbine revolutions—actually, a change rate indicative of a rate at which the numbers of turbine revolutions change for 16 msec). More specifically, the correction coefficient $C_5$ is set uniformly at "1" at the time of downshifting while it is read from a map prepared in advance on the basis of an amount of changes in a number of turbine revolutions to be calculated by the following formula (7) only at the time of upshifting:

$$\text{Amount of Changes in Turbine Revolutions} = (N_k - N_{k-1}) - \alpha_m(k) \quad (7)$$

where
$N_k$ stands for an actual number of turbine revolutions for the k-th control cycle;
$N_{k-1}$ stands for an actual number of turbine revolutions for the (k−1)th control cycle; and
$\alpha_m(k)$ stands for a target number of turbine revolutions for the k-th control cycle.

At the time of upshifting, the correction coefficient $C_5$ is set to be "1" in the formula (7) when an amount of change in numbers of turbine revolutions is between −10 rpm and 10 rpm. And the correction coefficient $C_5$ is determined so as to become larger gradually as the amount of change in numbers of turbine revolutions gets larger in a minus (−) direction while it is determined so as to become smaller gradually as the amount of change in numbers of turbine revolutions gets larger in a positive (+) direction.

Figure 10:
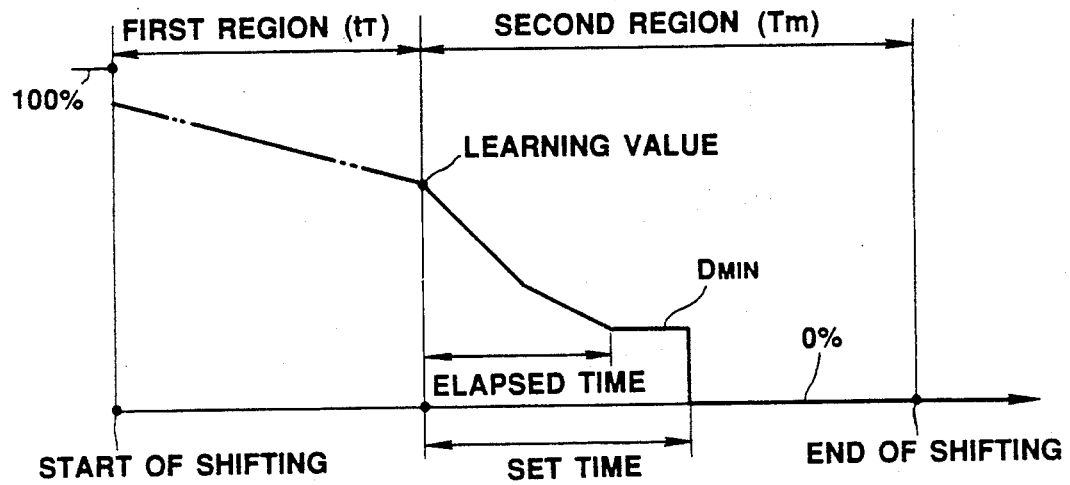
FIGS. 10 and 11 each is a view showing a manner of variation in duty ratios in the process of the feed-forward control for the second region.
Figure 11:
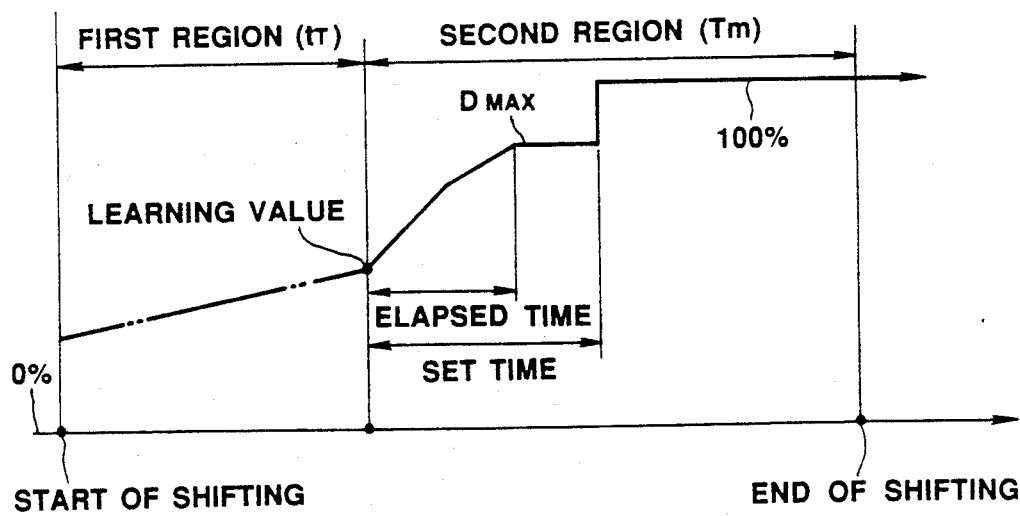

In the feed-forward control, a minimum value $D_{MIN}$ (>0%) and a maximum value $D_{MAX}$ (<100%) are set with respect to the duty ratio only at the time of shifting between the second and third speed ranges where the 2-4 brake 23 and the 3-4 clutch 27 are operatively switched and at the time of shifting between the first and fourth speed ranges. In each case, it is to be noted, however, that the duty ratio is determined in the same manner as have been described hereinabove until it amounts to the minimum value or the maximum value. The duty ratio is then changed to 0% or 100% after a control time predetermined has elapsed—in this embodiment, the control time being uniformly set at every 0.4 seconds. If the duty ratio would have come to the minimum value $D_{MIN}$ or the maximum $D_{MAX}$ before the set control time has elapsed, the minimum value or the maximum value is maintained until the set control time elapses. FIG. 10 shows a manner of control in which the duty ratio is in the process of feed-forward control in a direction in which it is decreased while FIG. 11 shows a manner of control in which the duty ratio is in the process of feed-forward control in which it is increased.

The second region control is finished in either case when a state in which the difference between the actual number of turbine revolutions and the target number of turbine revolutions $N_E$ is below a predetermined value (in this embodiment, 40 rpm) continues for a predetermined period of time or when the control time Tm has elapsed.

(c) Operation of Duty Solenoid Valves 45B and 45C:

The duty solenoid valves 45B and 45C are operatively driven in both the first and second regions in the duty ratio determined in the manner as has been described hereinabove by means of the interrupt process for each 2 msec, and the actual number of turbine revolutions is read in likewise by the interrupt process for every 2 msec. It is to be noted herein that, in order to absorb a variation in revolutions, an actual number of turbine revolutions used for control is a mean value of the actual numbers for 6 pulses (namely, 12 msec) and that the mean value is renewed per pulse.

In the feed-back control in the second region, timings of turning the duty solenoid valves 45B and 45C on or off are set as follows. When oil pressures are reduced (namely, when S=−1), on the one hand, the duty solenoid valve 45B or 45C is kept ON until the actual number of turbine revolutions comes to the target number of turbine revolutions for each of control cycles and it is turned OFF after the two numbers come to coincide with each other. When oil pressures are increased (namely, S=+1), on the other hand, the duty solenoid valve 45B or 45C is kept OFF until the target number of turbine revolutions becomes equal to or larger than the actual number of turbine revolutions for each control cycle and it is turned ON after the target number thereof becomes greater than the actual number thereof. This operation is adopted in order to ensure durability of the duty solenoid valves 45B and 45C and facilitate responsiveness to a variation in oil pressures on top of avoidance of a frequency in turning the duty solenoid valves 45B and 45C off and on.

Figure 12A:
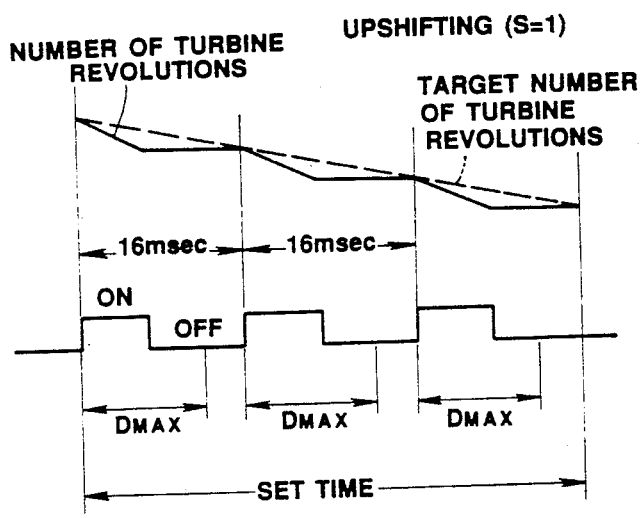
FIG. 12A is a graph showing a manner of duty control in the feed-back control for the second region.
Figure 12B:
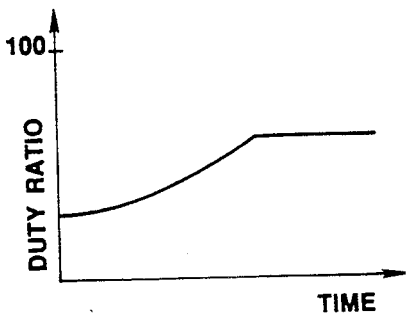
FIG. 12B is a graph showing a manner of changes in duty ratios with an elapse of time in the process of the duty control of FIG. 12A.
Figure 13A:
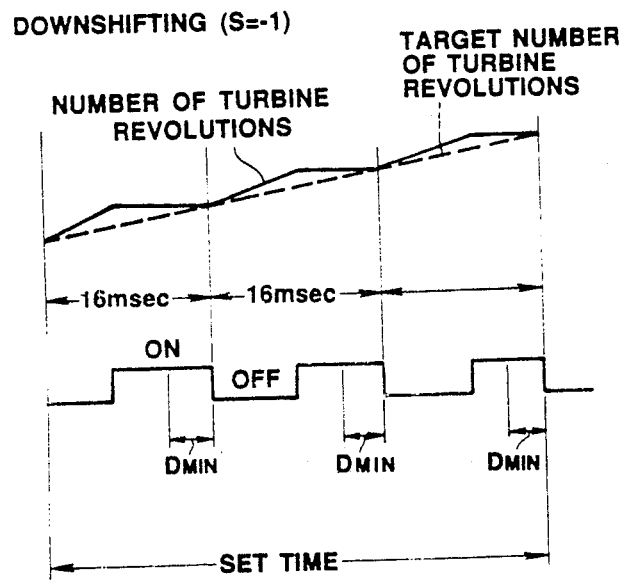
FIG. 13A is a graph showing a manner of duty control in the feed-back control for the second region.
Figure 13B:
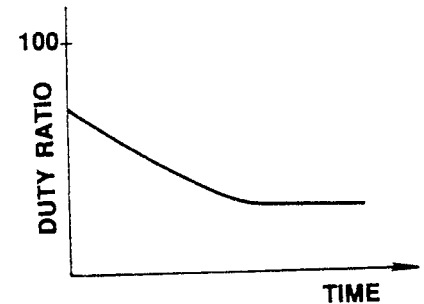
FIG. 13B is a graph showing a manner of changes in duty ratios with an elapse of time in the process of the duty control of FIG. 13A.

FIG. 12A shows relationships of numbers of turbine revolutions vs. duty ratios within a set time when oil pressures are decreased at the time of upshifting, and FIG. 13A shows relationships of numbers of turbine revolutions vs. duty ratios within a set time when they are increased at the time of downshifting. FIG. 12B shows a variation in duty ratios in the course of the time in correspondence to FIG. 12A, and FIG. 13B shows a variation in duty ratios in the course of the time in correspondence to FIG. 13A. It is noted herein that the duty ratio is provided with a minimum value $D_{MIN}$ and a maximum value $D_{MAX}$ within a predetermined time (<Tm) from the start of control in the second region, and neither of the duty solenoid valves 45B nor 45C come to 0% and 100% until the second region control has been finished.

Third Region Control:

In the third region, first, as adjustment of oil pressures by the duty solenoid valves 45B and 45C has been finished, the duty solenoid valves 45B and 45C are turned OFF or ON and the corresponding duty ratios are set at 0% or 100%, respectively, in accordance with a state in which the 2-4 brake 23 and the 3-4 clutch 27 are coupled or uncoupled. Second, a learning value is determined for optimizing a control value to be used in the first and second regions, as will be described hereinbelow.

A manner of determining the learning value for the feed-back control differs from that for the feed-forward control. For the feed-back control, on the one hand, the learning value is basically determined on the basis of a mean ON-time of the duty solenoid valves 45B and 45C per control cycle of the feed-back control in the second region and on the basis of a final duty ratio $D_L$ in the feed-back control. The mean ON-time of the duty solenoid valves 45B and 45C in one control cycle is decided as a mean value $D_{mean}$ by dividing the sum of ON-time (the total ON-time) during the total period of the second region by a set control time Tm in which the second region control is executed. Using the mean value $D_{mean}$, a primary learning value $D_{S1}$ is computed by the following formula (8):

$$D_{S1} = (2 \times D_{mean} - D_L) \times 1/16 \times 100 \qquad (8)$$

The primary learning value $D_{S1}$ is multiplied by an oil temperature correction coefficient and a throttle opening correction coefficient to obtain a secondary learning value $D_{S2}$, provided that the oil temperature correction coefficient is determined to become a basic value at the time when the oil temperature is 80° C. and that the throttle opening correction coefficient is determined to become a basic value at the time when a degree of throttle opening is 50%.

A final learning value $D_{S3}$ is then determined in accordance with a manner of shifting, for example, upshifting from the first speed range to the second speed range, by averaging the addition of a secondary learning value $D_{S2}$ obtained at the latest time to another secondary learning value $D_{S2}$ obtained at the previous time. It is to be noted that, if there is no previous learning value, the secondary learning value $D_{S2}$ obtained at the latest time is used intact as an initial value for the final learning value $D_{S3}$.

For the feed-forward control, on the other hand, a primary learning value $D_{S1}'$ is first determined by the following formula (9) when the coefficient S indicative of a direction of an increase or decrease in oil pressures is "−1" and by the following formula (10) when the coefficient S is "+1":

$$D_{S1}' = D_{MIN} + \Delta D \times (\text{elapsed time}) \qquad (9)$$

$$D_{S1}' = D_{MAX} + \Delta D \times (\text{elapsed time}) \qquad (10)$$

In the above formulas (9) and (10), it is to be noted that $D_{MIN}$ and $D_{MAX}$ are as shown in FIGS. 10 and 11, respectively, the elapsed time is a time elapsed until the learning value has reached $D_{MIN}$ or $D_{MAX}$, as shown in FIGS. 10 and 11, and $\Delta D$ is indicated in the formula (6).

The primary learning value $D_{S1}'$ obtained by the formula (9) or (10) is then multiplied by the oil temperature correction coefficient and the throttle opening correction coefficient to give a secondary learning value $D_{S2}'$, like the secondary learning value $D_{S2}$ for the feed-back control. A final learning value $D_{S3}'$ is then determined by averaging the addition of the secondary learning value $D_{S2}'$ obtained at the latest time to that obtained at the previous time, like the final learning value $D_{S3}$ for the feed-back control. It is likewise noted that, if there is no final learning value $D_{S3}'$ for the previous time, the secondary learning value $D_{S2}'$ obtained at the latest time is used as an initial value for the final learning value $D_{S3}'$.

The final learning values $D_{S3}$ and $D_{S3}'$ obtained as above for the feed-back and feed-forward control, respectively, are stored or renewed on the RAM for each manner of shifting.

Figure 14:
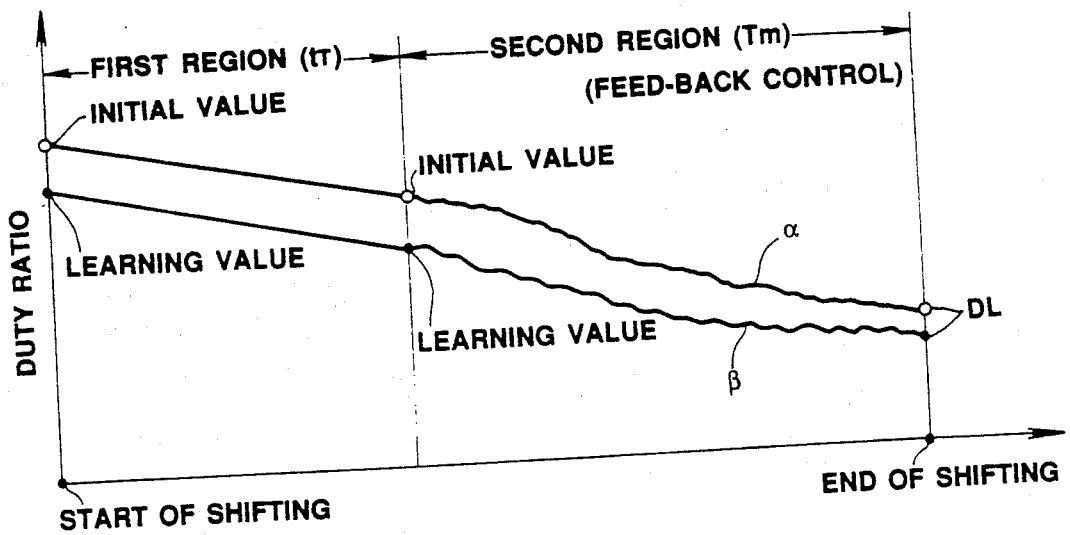
FIG. 14 is a graph showing a manner of optimizing control by means of a learning value for the feed-back control.
Figure 15:
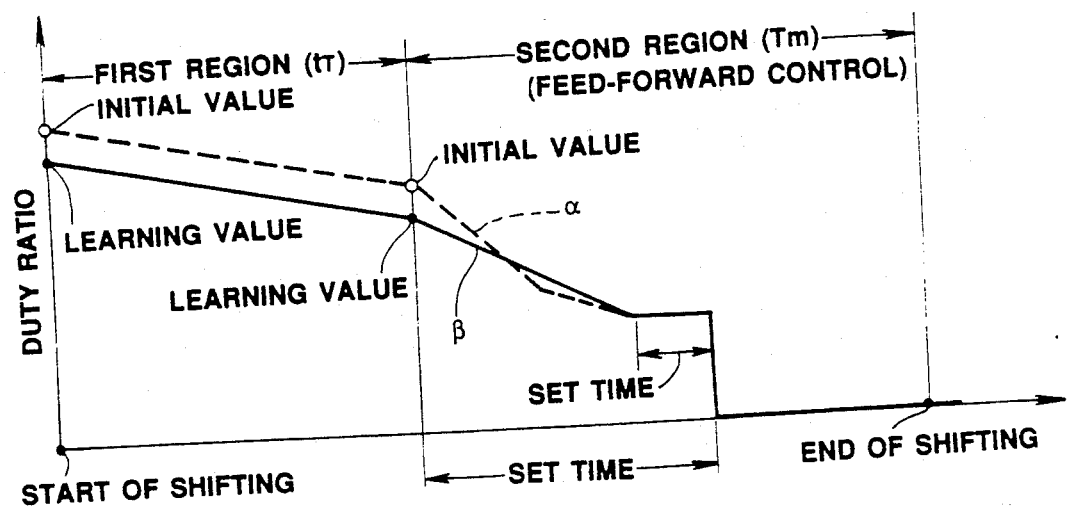
FIG. 15 is a graph showing a manner of optimizing control by means of a learning value for the feed-forward control.

FIGS. 14 and 15 are each a graph showing a manner in which control is optimized by the learning value for the feed-back control and for the feed-forward control, respectively, as determined above. In FIGS. 14 and 15, the line $\alpha$ is indicative of the case where no learning value is present while the line $\beta$ is indicative of the case where the learning value is present.

FLOWCHART (FIGS. 16–21)

FIGS. 16 to 21A and 21B show flowcharts for executing the control as has been described hereinabove.

Figure 16:
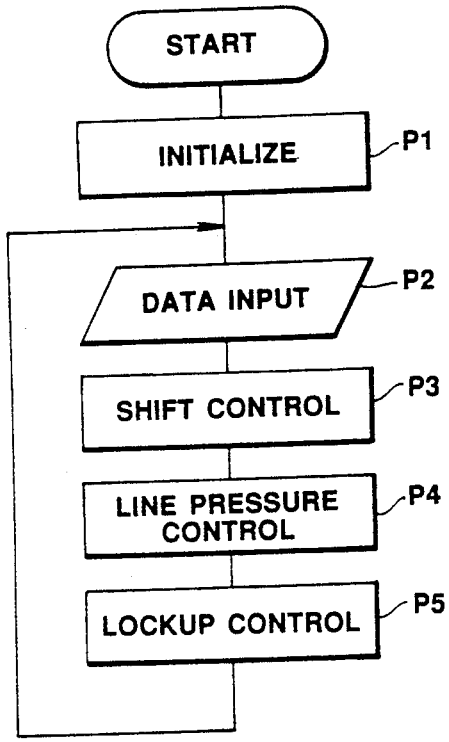
FIGS. 16 to 21B are flowcharts showing an example of control according to the present invention.

FIG. 16 is a flowchart showing an overall outline of the control with the control unit U. At step P1, the system is initialized and input signals are read in at step P2. At step P3, the shift control is executed followed by the line pressure control at step P4 for optimizing a coupling force for the brakes and the clutches in accordance with speed ranges. Then at step P5, the lockup control is implemented.

Figure 17:
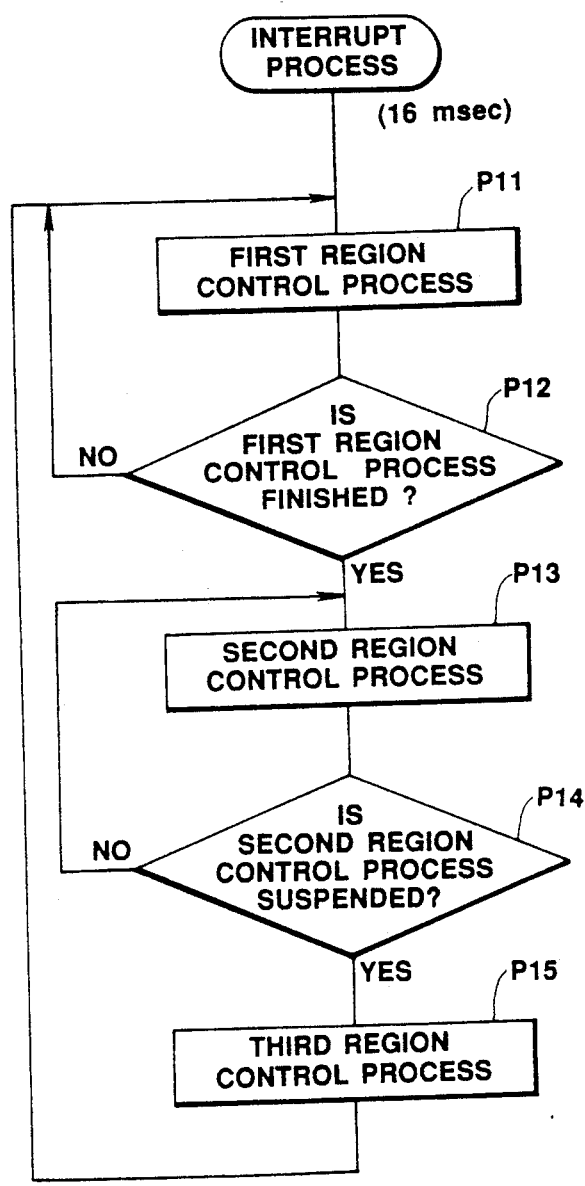

As shown in FIG. 17, the interrupt process is executed repeatedly for every 16 msec in the shift control process at step P3 in FIG. 6, and the flow proceeds to step P11 where the first region control is executed. When it is decided at step P12 that the first region control has been finished, the flow then proceeds to step P13 and the second region control is executed. At step P15, the third region control is executed following the decision process at step P14 for deciding whether the second region control process has been finished. The process is designed such that another region can be processed before the process for the previous control has not been finished yet.

Figure 18:
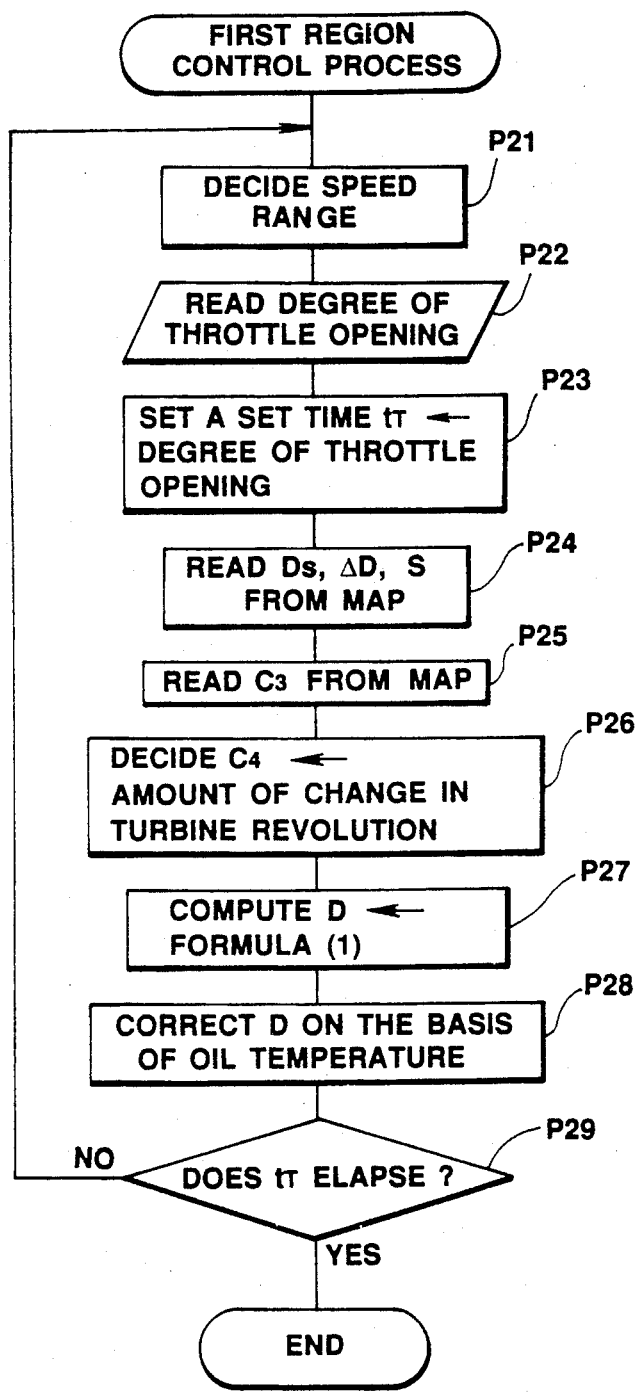

First Region Control (FIG. 18)

FIG. 18 indicates the first region control at step P11 in FIG. 17. At step P21, the speed range sought to be shifted is decided and a manner of shifting is determined, for example, from the first speed range to the third speed range. A degree of opening of the throttle valve is then read in at step P22 and a control time $t_T$ for the first region is decided at step P23. Thereafter, at step P24, the learning value $D_S$, the base value $\Delta D$, and the coefficient S are read from a map. Then at step P25, the coefficient $C_3$ is read from the map and, at step P26, the coefficient $C_4$ is determined in accordance with the magnitude of the number of turbine revolutions. Thus, at step P27, the duty ratio D is computed by the formula (1) above and, at step P28, it is then corrected on the basis of oil temperature. At step P29, it is then decided whether the control time $t_T$ has elapsed. If YES at step P29, the process is finished. In other words, the first region control is over at the time when the control time $t_T$ has elapsed.

Figure 19A:
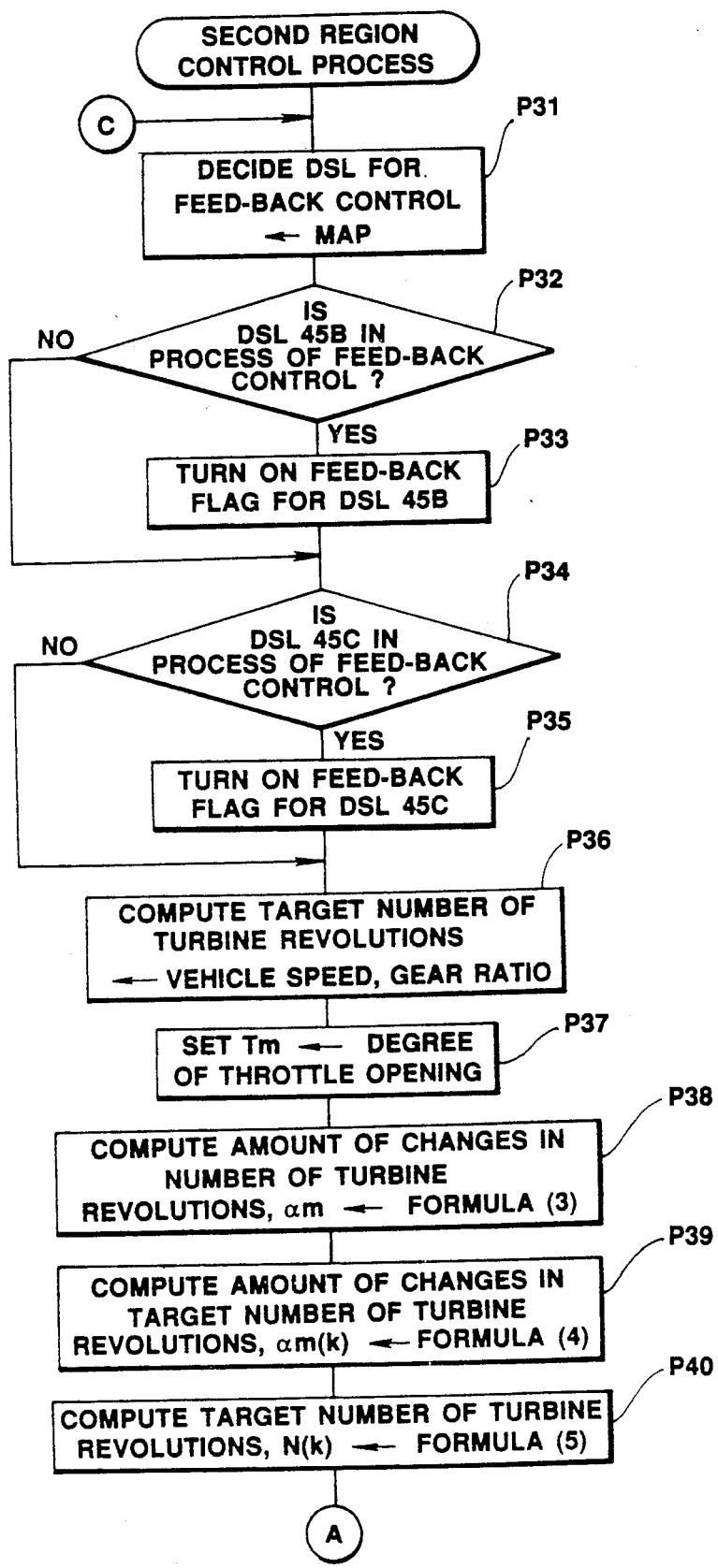
Figure 19C:
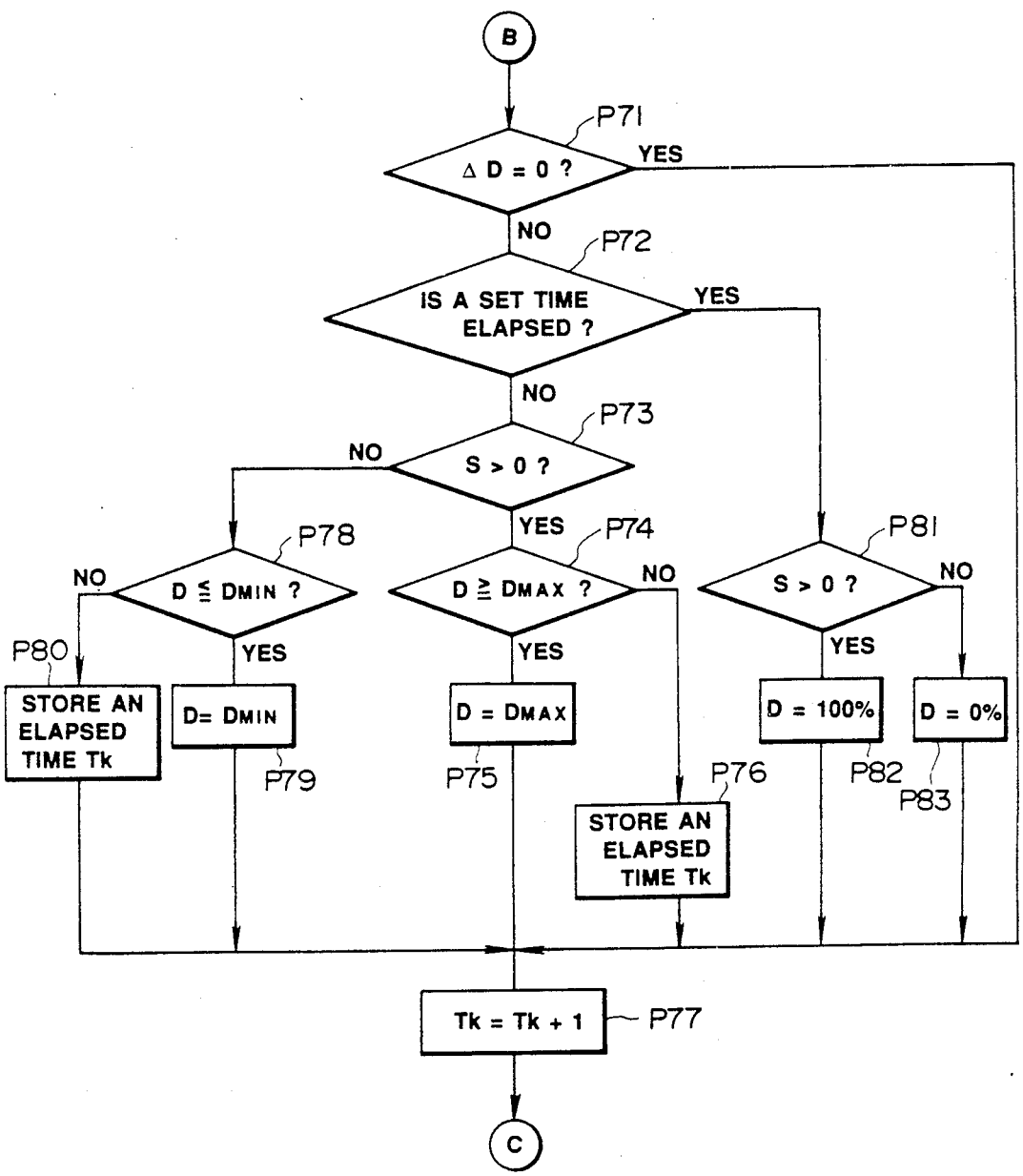

Second Region Control (FIGS. 19A–19C)

FIGS. 19A to 19C indicate the detail of the second region control at step P13 of FIG. 17, in which steps P31 to P40 and steps P51 to P55 are for the feed-back control and steps P58 to P63 and steps P83 are for the feed-forward control. Furthermore, steps P56 and P57 are for the decision process for conclusion of the second region control while steps P64 to P66 are for the post-processing.

At steps P31 to P35, it is decided which of the duty solenoid valves 45B and 45C should be subjected to feed-back control and a flag is ON for the duty solenoid valve sought to be feed-back controlled at step P33 or P35. More specifically, at step P32, it is decided whether or not the duty solenoid valve 45B is in the process of the feed-back control and, if YES, the flow proceeds to step P33 where the flag for the duty solenoid valve 45B is ON. If NO at step P32, the flow proceeds to step P34 where it is decided whether or not the duty solenoid valve 45C is in the process of the feed-back control. If YES at step P34, the flag for the duty solenoid valve 45C is ON at step P35, and if NO at step P34, the flow advances to step P36.

Referring to FIG. 19A, the target number of turbine revolutions, $N_E$, is computed by the formula (2) at step P36 as a number of turbine revolutions that will reach after the shifting. More specifically, the target number of turbine revolutions is computed by multiplying the actual number of turbine revolutions before shifting, $N_S$, by a gear ratio before shifting to a gear ratio after shifting. At step P38, a change rate, $am$, at which the target numbers of turbine revolutions change, is calculated by the formula (3) following the setting of the control time Tm at step P37. Then at step P39, an amount, $am(k)$, of change in target numbers of turbine revolutions for each of the control cycles is computed by the formula (4) and, at step P40, the target number of turbine revolutions, $N(k)$, is determined.

Following the determination of the target number of turbine revolutions, $N(k)$, at step P40, it is processed at steps P51 to P55 so as to be within a range that provides the final target number of turbine revolutions, $N_E$, after shifing, for a limit value.

In the feed-forward control starting with step P59 in FIG. 19B, the duty ratio $D(k)$ is determined by the formula (6) via the process at steps P58 to P63.

After the duty ratio $D(k)$ is corrected on the basis of the oil temperature at step P63, it is then decided at step P71 whether $\Delta D = 0$. If NO at step P71, the flow proceeds to step P72 where it is decided whether or not the set control time has elapsed. If NO at step P72, the process from step P73 to step P79 is performed in order to set the duty ratio $D(k)$ within a range that does not exceed the maximum value $D_{MAX}$ or the minimum value $D_{MIN}$. In other words, the coefficient, S, indicative of a direction of increasing or decreasing oil pressures, is decided at step P73 whether it is larger than 0. If YES at step P73, it is judged whether or not $D \geq D_{MAX}$ at step P74 and, if YES at step P74, $D = D_{MAX}$ at step P75, while the flow proceeds to step P76, if NO at step P74, and the time elapsed, Tk, is stored. If NO at step P73, it is judged whether $D \leq D_{MIN}$ at step P78. If YES at step P78, D is determined to be $D_{MIN}$ at step P79, while if NO at step P78, the time elapsed, Tk, is stored at P80. The time Tk stored at step P76 or P80 is then renewed at step P77. Furthermore, by the process at steps P71 and P72 and steps P81 to P83, the duty ratio is set after the set control time has elapsed as shown in FIGS. 10 and 11.

Turning back to FIG. 19B, if it is decided at step P56 that the difference between the actual number of turbine revolutions, N, and the target number of turbine revolutions, $N_E$, is smaller than a set value and furthermore that this state continues for a predetermined period of time, it means that the second region control is completed. Then the flow goes to step P64 and the time elapsed Tk from the start of the second region control to the current point of time is stored as a mode of learning values. Then the learning flag is OFF at step P65 and the manner of shifting at the latest time, for example, upshifting from the first speed range to the third, is stored at step P66 in such a mode as relating to the learning value. Likewise, if it is decided at step P57 that Tk is equal to or larger than Tm, it means that the second region control is completed so that the process from steps P65 to P66 is carried out. It is to be noted herein that, although no process is executed here as done at step P64 when it is decided YES at step P57, this is because the set control time Tm at the latest time is not necessarily optimal.

Figure 20A:
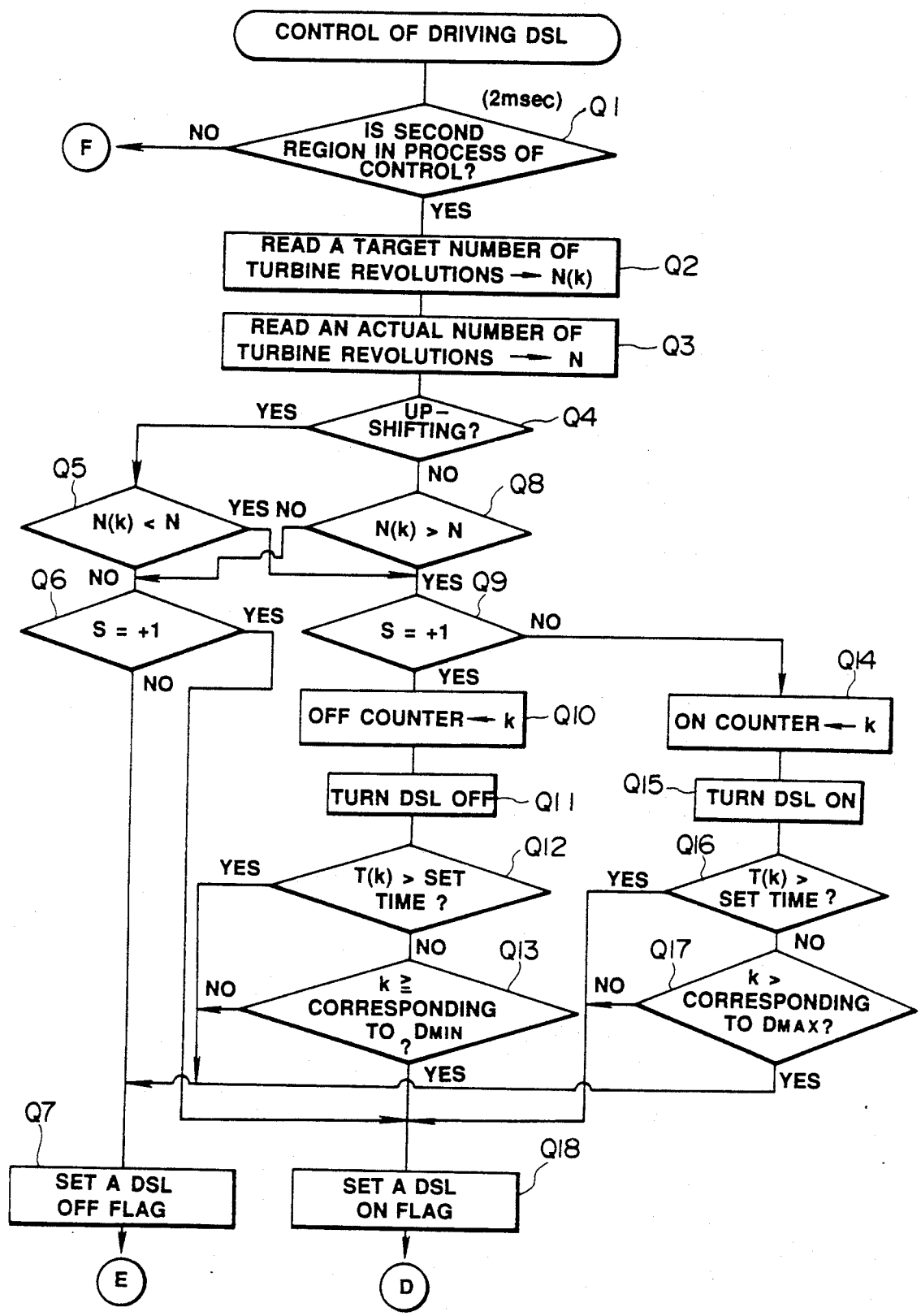
Figure 20B:
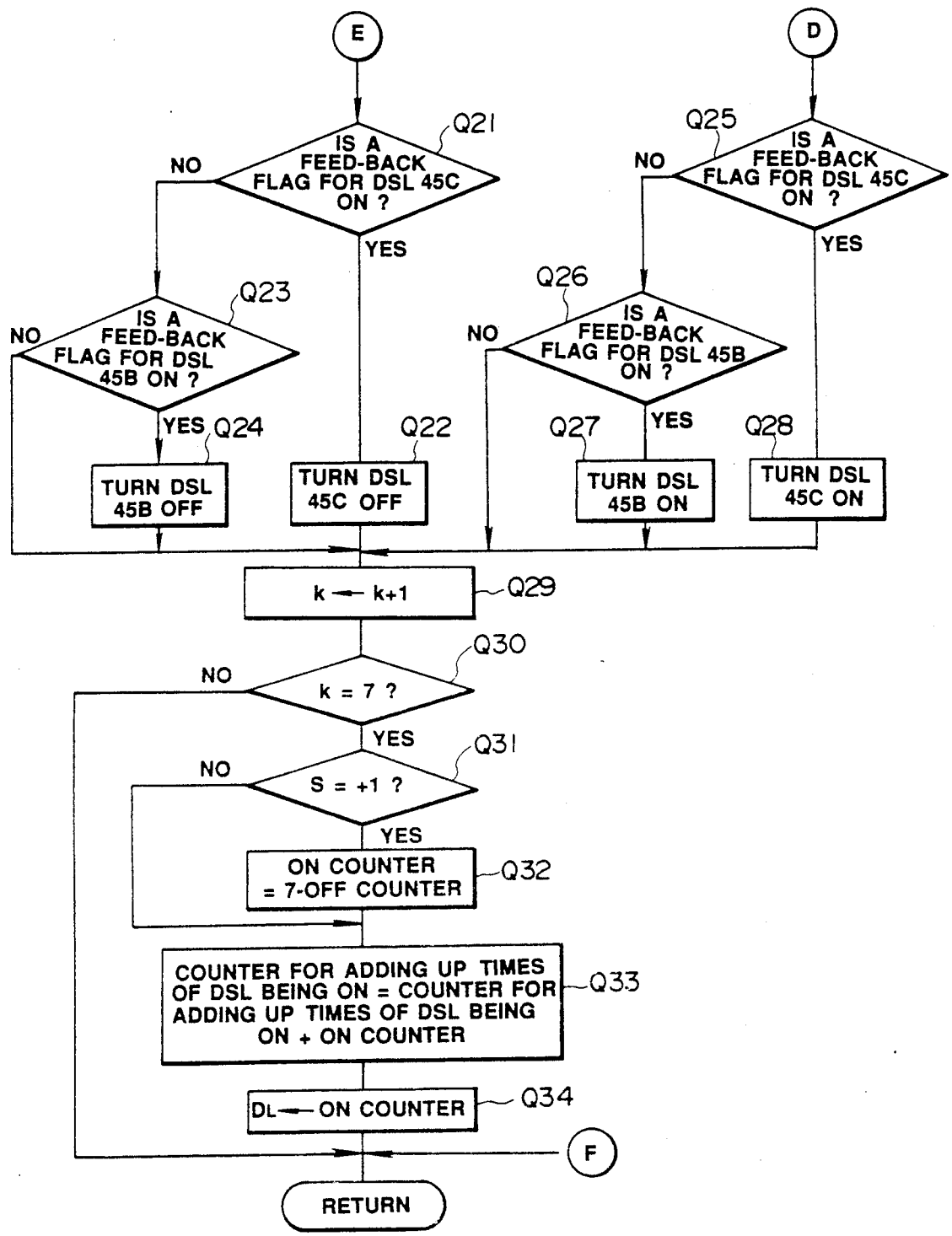

Drive Control Of Duty Solenoid Valves (FIGS. 20A-20B)

FIGS. 20A and 20B indicate the drive control of the duty solenoid valves for the feed-back control in the second region, provided that the duty ratio determined hereinabove is given as it is for the feed-forward control in the first and second regions.

After the second region is confirmed at step Q1 as being in the process of control, the target number of turbine revolutions, $N(k)$, is read at step Q2 and the actual number of turbine revolutions, N, is read at step Q3.

Thereafter, as a general rule, by distinguishing whether the transmission is upshifted or downshifted or whether the coefficient S is a positive (+) number or negative (−) number, whether the control of turning the duty solenoid valve ON then OFF, as shown in FIG. 12A, or the control of turning the duty solenoid valve OFF then ON, as shown in FIG. 13A, is determined. In the former case, the DUTY SOLENOID ON flag is set at step Q18 while, in the latter case, the DUTY SOLENOID OFF flag is set at step Q7. The process at steps Q10, Q11, Q14 and Q15 is for the current number of turbine revolutions, N, to approach the target number of turbine revolutions, $N(k)$. By distinguishing at steps Q12 and Q16 whether the set time has elapsed as shown in FIGS. 12A and 13A, respectively, it is determined whether the maximum value $D_{MAX}$ (FIG. 12A) or the minimum value $D_{MIN}$ (FIG. 13A) should be set at step Q17 or Q13.

Subsequent to step Q18, the process from step Q25 to Q28 turns on the duty solenoid valve on the side of the feed-back flag which has been ON at step P33 or P35 in FIG. 19A. Likewise, subsequent to step Q7, the process from step Q21 to Q24 turns off the duty solenoid valve on the side of the feed-back flag which has been ON.

After the process from steps Q25 to Q28 or from steps Q21 to Q24, the value k is counted up in a unit of every 2 msec. The value k indicates a time when the duty solenoid is turned on or off in every 2 msec. Then at step Q30, it is distinguished whether the count value k is 7, in other words, whether 14 msec out of one control cycle of 16 msec has elapsed. If NO at step Q30, on the one hand, the flow returns as it is. If YES at step Q30, on the other, the process from step Q31 to step Q33 provides a count value indicative of the sum of the total period of time where the duty solenoid valve has been turned on from the start of the first region control and the count value of ON-time indicated at the latest time and renews the total count value. Then at step Q34, the count value of ON-time at the latest time is renewed as $D_L$.

Figure 21A:
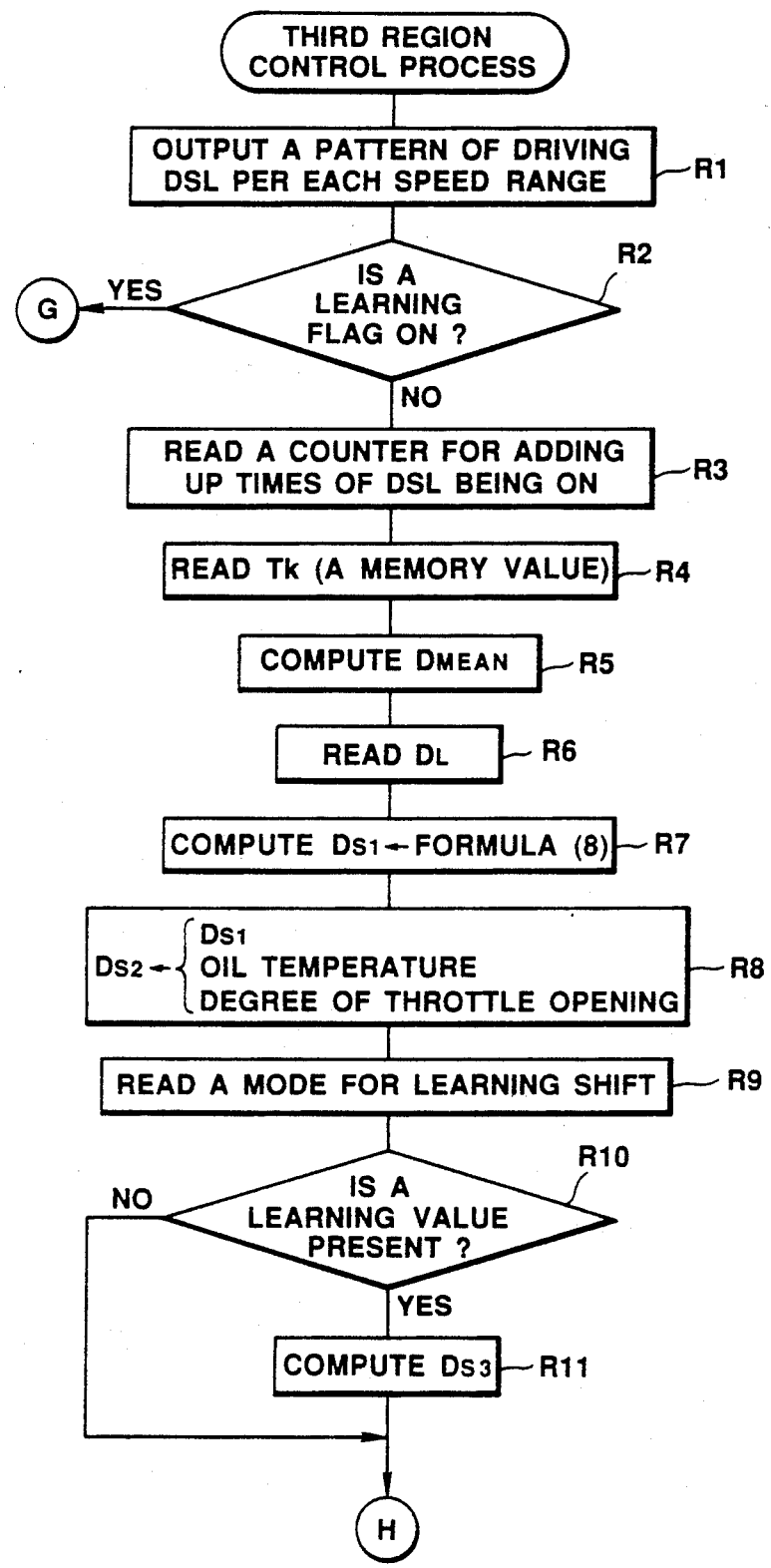
Figure 21B:
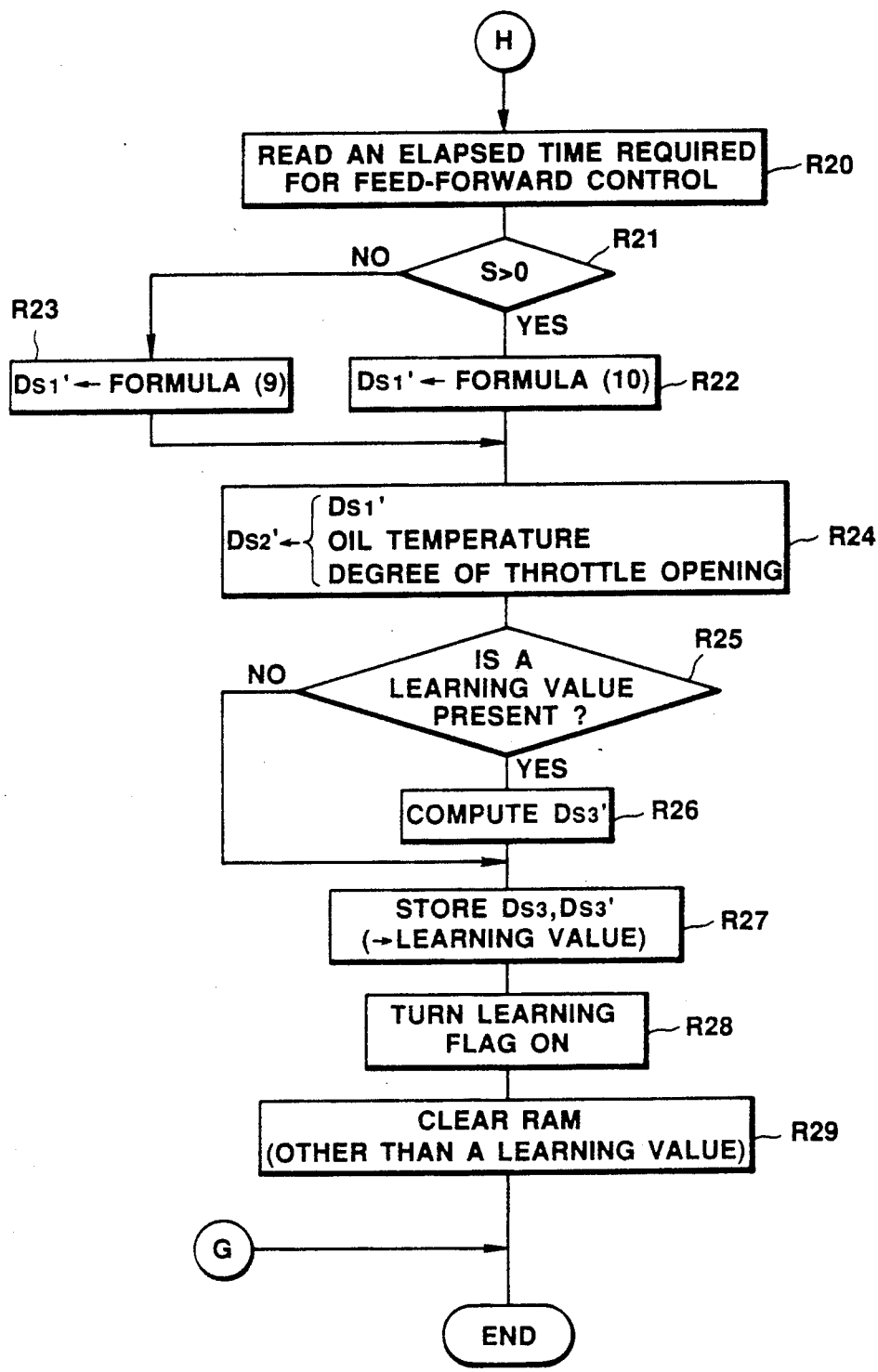

Third Region Control (FIGS. 21A-21B)

A flowchart of FIGS. 21A and 21B indicate the detail of the third region control of step P15 shown in FIG. 17.

At step R1, as adjustment of oil pressures has been finished in the third region, the duty ratio is changed to 0% or 100%—in other words, the duty solenoid valves 45B and 45C are turned off or on—in accordance with speed ranges after shifting. Thereafter, at step R2, it is distinguished whether the learning flag is ON. If ON at step R2, it means that the setting or the renewal of the learning value to be executed when the second region control has been finished has already been implemented (refer to step P65 in FIG. 19B and step R28 in FIG. 21B). Accordingly, when it is distinguished YES at step R2, the flow ends because it means that the control for obtaining a learning value as will be described hereinbelow has been finished.

If it is distinguished NO at step R2, the flow proceeds to step R3 and the process from step R3 to step R11 is executed to provide the final learning value $D_{S3}$ for the feed-back control, on the one hand, and the process from step R21 to step R26 is executed to provide the final learning value $D_{S3}'$ for the feed-forward control.

Steps R27 to R29 are for post-processing the final learning value $D_{S3}$ for the feed-back control and the final learning value $D_{S3}'$ for the feed-forward control. At step R27, the final learning values $D_{S3}$ and $D_{S3}'$ are stored in the RAM and, at step R28, the learning flag is ON because the control for providing the learning value has been finished. Then at step R29, in order to provide the final learning value at the latest time, various data stored in the RAM is cleared for new data input for providing a coming learning value. The data to be cleared are the control time $t_T$ for the first region, the control time Tm for the second region, the DSL ON-time count value, the count time of the total DSL ON-time, and the final duty ratio $D_L$.

VARIANTS OF SHIFT CONTROL (FIGS. 22A–27A)

FIGS. 22A to 27A shows variants in shift control in which the basic control manner is the same as for the previous embodiments.

FIGS. 22A to 22G shows each a map of a value to be used for the first and second region control and the map is stored in a memory in the control unit U.

More specifically, FIG. 22A shows a map of an initial value of the duty ratio, $DU_0$, that is set and stored in accordance with degrees of throttle opening. It is noted that the figures are indicative of ratios with respect to the full opening of the throttle valve. FIG. 22B shows a map of the optimal control time $t_T$ for the first region. The optimal control time $t_T$ is set and stored in accordance with degrees of throttle opening, namely, opening of the throttle valve. FIG. 22C shows a map of a change rate ΔDU, the minimum value DU(min), and the maximum value DU(max), of duty ratios for the first region and these values are set and stored in accordance with oil temperatures. It is to be noted herein that the minimum value DU(min) and the maximum value DU(max) are designed so as to leave a control margin for the second region. FIG. 22D shows a map of correction values $ΔDU_0$ for the initial value $DU_0$ of the duty ratios, and the correction value $ΔDU_0$ is set as a value corresponding to the absolute value of the difference between the optimal control time $t_T$ stored in the map of FIG. 22B and a learning value for the control time for the first region to be investigaged under a predetermined condition. FIG. 22E is a map of optimal control time Tm for the second region, and the time Tm is set for each of speed ranges in accordance with degrees of throttle opening. FIG. 22F shows a map of a change rate ΔDUr, the minimum value DUr(min), and the maximum value DUr(max), of duty ratios for the feed-forward control in the second region control, and these values are set in accordance with oil temperatures. FIG. 22G shows a map of a correction value ΔDUrr for the change rate ΔDUr, and the correction value ΔDUrr is set in accordance with the absolute value of the difference between the optimal control time Tm stored in the map of FIG. 22E and the control time for the second region to be investigated under a predetermined conditions.

FIGS. 23 to 27B show flowcharts indicating the detail of control at the time of shifting.

Figure 23:
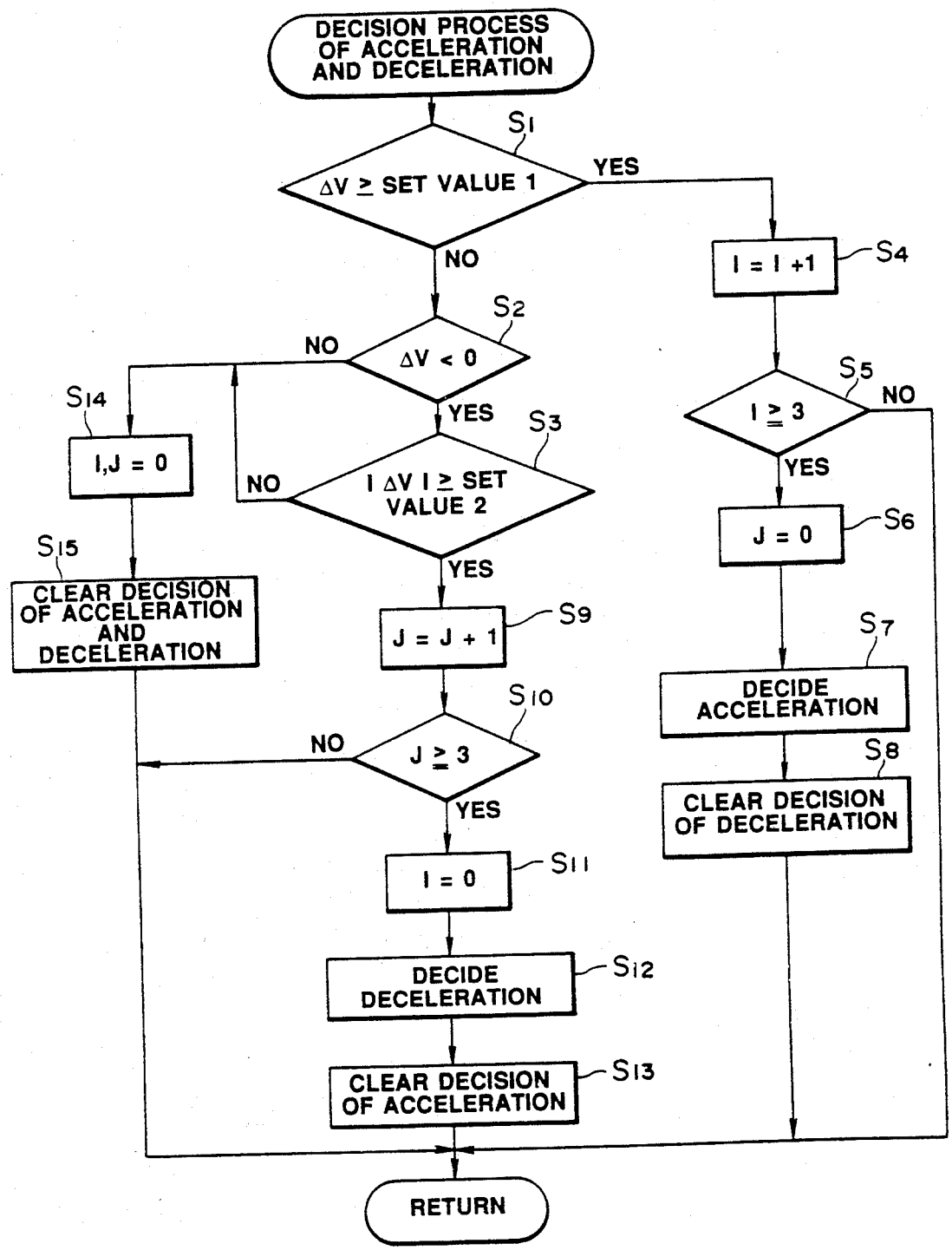

FIG. 23 is a routine process for deciding acceleration or deceleration necessary for investigating learning conditions of a control time for the first region as will be described hereinbelow.

At step S1, it is distinguished whether or not a variation in vehicle speeds ΔV for 0.4 or 0.5 second is equal to or larger than a first set value. If NO at step S1 and if the variation ΔV is found to be a value with negative sign at step S3, it is decided at step S3 whether the absolute value of the variation ΔV is equal to or larger than a second set value.

In order to avoid an error in the decision process, the decision of acceleration is made by the process from step S4 to step S7 if YES at step S1. In this process, when a counter I recognizes that the decision "YES" at step S1 is repeated three times in a row, a counter J is counted as "0" and acceleration is decided. And the decision for deceleration is cleared at step S8. And if the decision at step S3 is YES, whether this decision is repeated continuously three times is decided by the counter J at step S10. If decided YES at step S10, the counter I is changed to "0" at step S11 and deceleration is decided at step S12. Then at step S13, the decision of acceleration is cleared. At the time other than the time of acceleration and deceleration, the counters I and J are changed to "0" at step S14 and the decision for acceleration and deceleration is cleared at step S15.

Figure 24:
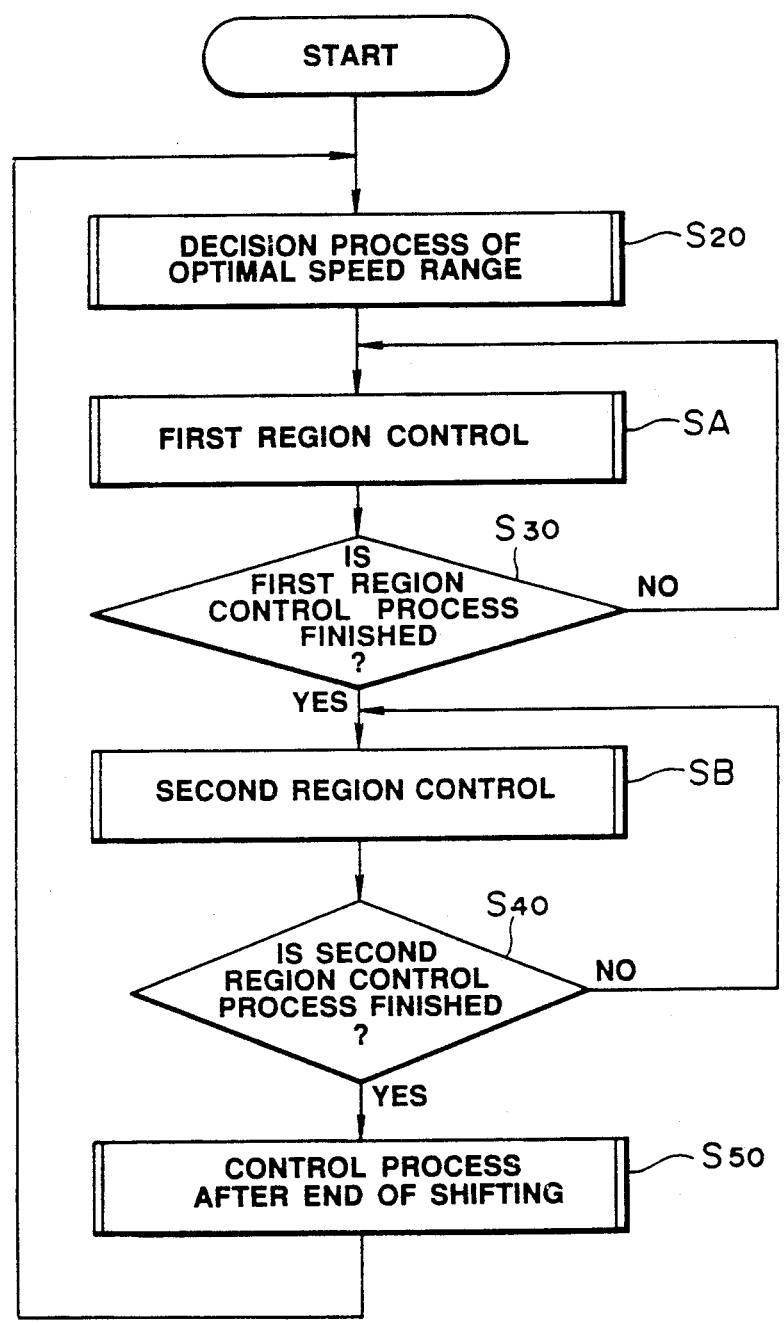

FIG. 24 shows a main routine for the control at the time of shifting speed ranges. At step S20, an optimal speed range (a speed range after shifting) is decided in accordance with a vehicle speed and a degree of throttle opening on the basis of a shift pattern set in advance. Then the first region control routine SA is repeatedly continued until the end of the control is decided at step S30. Following step S30 where the end of the control is decided, the second region control routine SB is then repeatedly contieded until the end of the first region control is decided at step S40. If the desired shifting has been achieved and it is decided at step S40 that the second region control has been finished, a control after the end of shifting, namely, the third region control, is executed at step S50 in order to fix the valves in such a state as corresponding to the optimal speed range according to Table 1.

Figure 25:
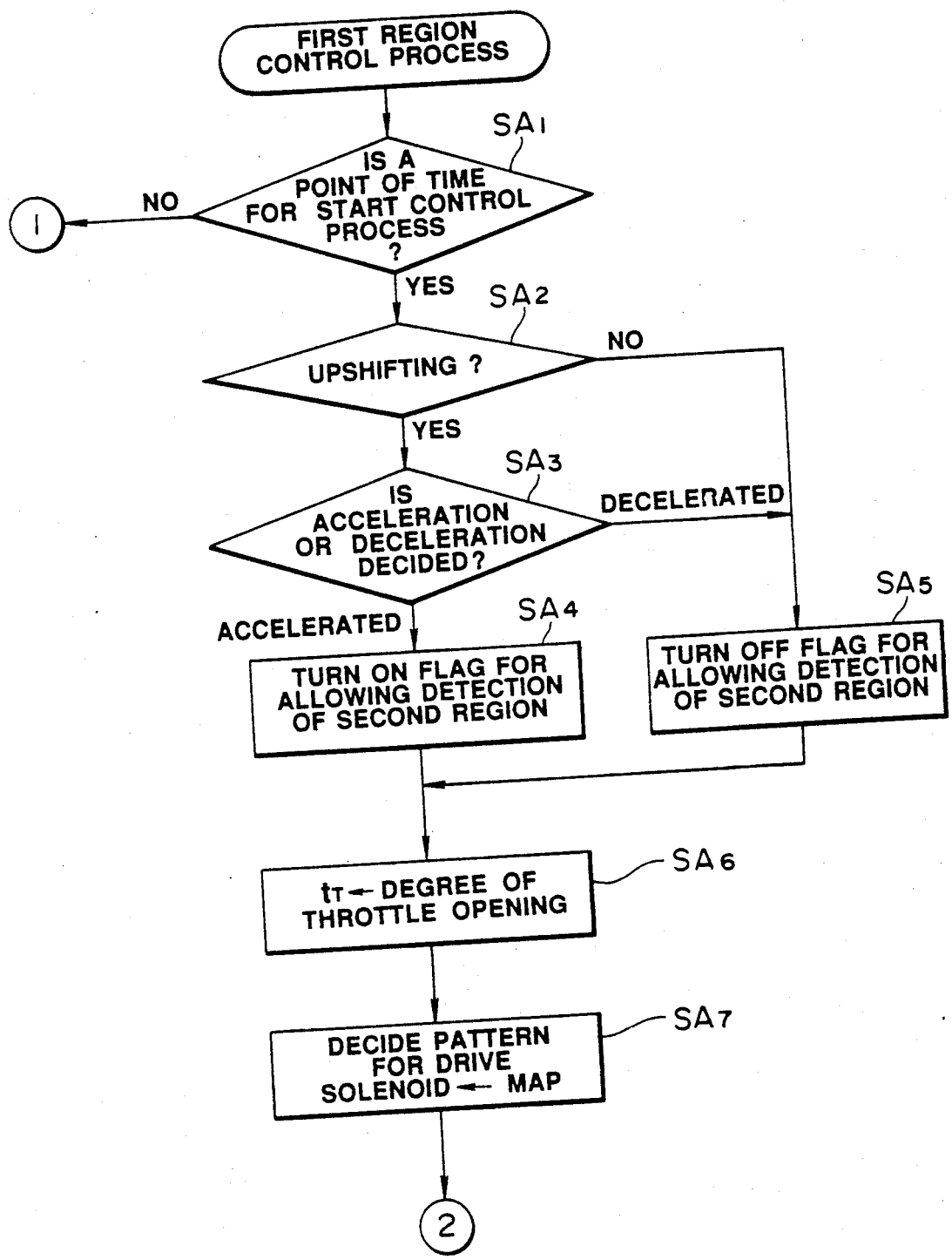
Figure 25B:
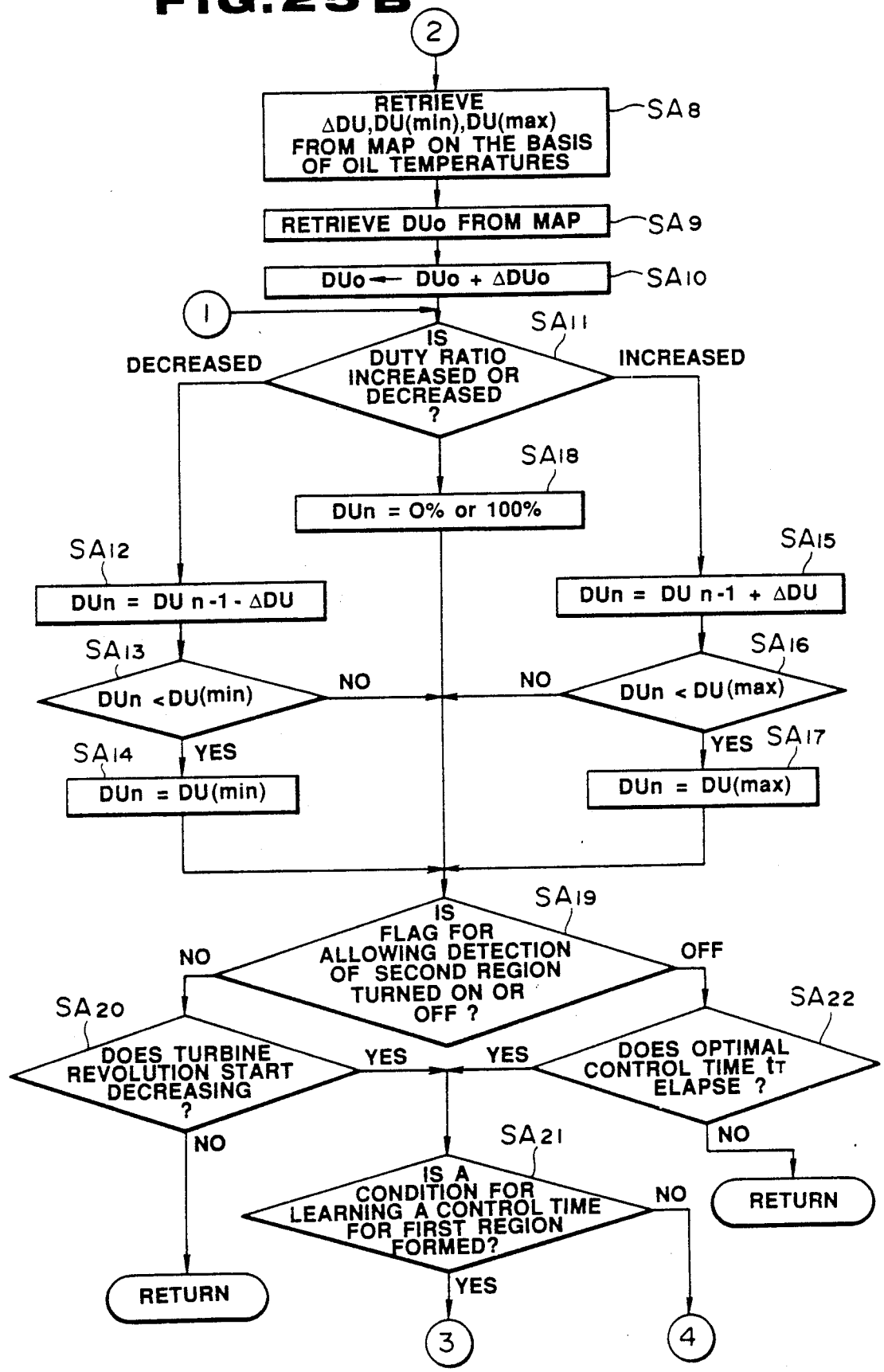
Figure 25C:
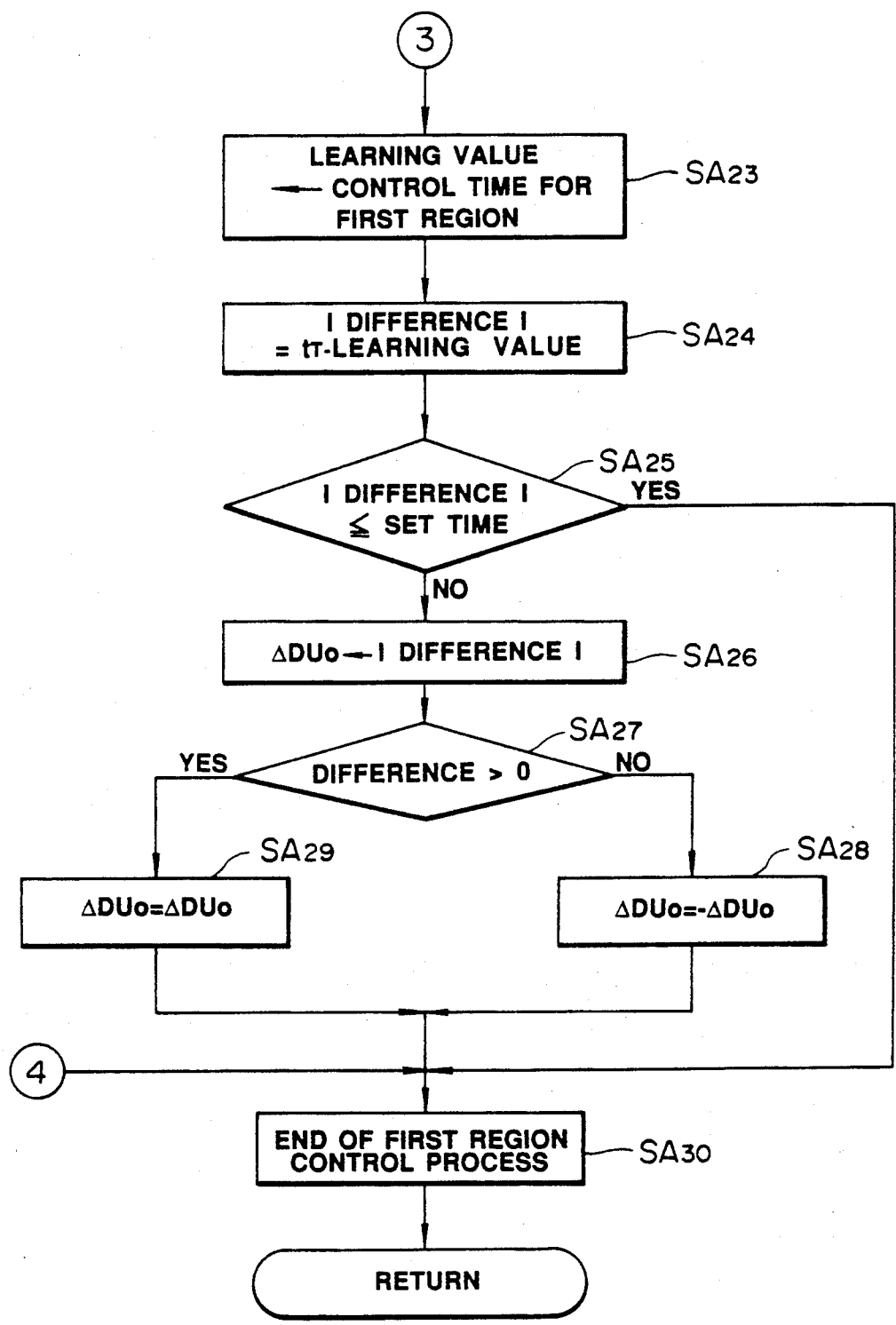

FIGS. 25A to 25C show the detail of the first region control routine SA of FIG. 24. As step SA1, if it is decided that it is a point of time for the start of control, namely, if YES at step SA1, it is decided at step SA2 whether or not the transmission is upshifted. When it is decided YES at step SA2, the flow proceeds to step SA3 where it is decided whether or not it is accelerated or decelerated. If the decision for acceleration is made at step SA3, a flag for allowing detection of the second region control is ON. In the other cases, the flag is OFF at step SA5.

Then the optimal control time $t_T$ is set from the map of FIG. 22B at step SA6 and a drive solenoid pattern, namely, a duty solenoid valve to be driven, is determined from the current speed range and the optimal speed range by means of a map retrieval at step SA7. And at step SA8, for the duty solenoid valves 45B and 45C, the change rate $\Delta DU$, the minimum value DU(min), and the maximum value DU(max), of the duty ratios in accordance with oil temperatures are retrieved from the map of FIG. 22C. The initial value $DU_0$ of the duty ratios is retrieved from the map of FIG. 22A at step SA9. Then at step SA10, the initial value $DU_0$ is corrected by the correction value $\Delta DU_0$ given at the time of the previous shifting.

After the initial value $DU_0$ was corrected at step SA10, the flow proceeds to step SA11 where it is decided each for the duty solenoid valves 45B and 45C whether the duty ratio is increased or decreased (see Table 3). If it is decided at step SA11 that the duty ratio is decreased, a value $DU_n$ is set at step SA12 as a current duty ratio which is obtained by subtracting the change rate $\Delta DU$ from the previous value $DU_{n-1}$ for the duty ratio, thus decreasing values for the duty ratio. If it is decided at step SA13 that the value $DU_n$ is smaller than the minimum value DU(MIN), the value $DU_n$ is set at step SA14 as a minimum value DU(min). If it is decided at step SA11 that the duty ratio is increased, the process of step SA15 is executed where the value $DU_n$ is obtained as a current duty ratio by adding the change rate $\Delta DU$ to the previous value $DU_{n-1}$ for the duty ratio, thus increasing values for the duty ratio. Then at step SA16, the current value $DU_n$ is decided whether it is larger than the maximum value DU(max) and, if YES at step SA16, the current value $DU_n$ is set as a maximum value DU(max). If it is decided at step SA11 that no duty ratio changes, the current value $DU_n$ for the duty ratio is set as 0% or 100% at step SA18.

When the current value $DU_n$ is set at step SA14 or SA17 or when the current value $DU_n$ is set as 0% or 100% at step SA18, it is then decided at step SA19 whether or not the flag for allowing detection of first region control is ON or OFF. If the flag is ON, on the one hand, the flow is returned as it is until it is decided at step SA20 that the number of turbine revolutions starts decreasing—that is, the routine process is repeated. When it is decided at step SA20 that the numbers of turbine revolutions start decreasing, the flow proceeds to step SA21. If the flag is OFF at step SA19, on the other hand, the flow proceeds to step SA22 where it is decided whether or not the optimal control time $t_T$ has elapsed. If NO at step SA22, namely, until the optimal control time $t_T$ elapses, the flow is returned, while the flow proceeds to step SA21 if YES at step SA22.

Then at step SA21, it is decided whether or not learning conditions are completed. The learning conditions for the control time $t_T$ in the first region are based on the fact that there is a point of inflection on a change in numbers of turbine revolutions and on upshifting in a state of acceleration, no pressures applied to the brake pedal, oil temperatures lower than a predetermined value, and the D or S range.

At step SA21, when it is decided that no learning conditions have been formed, then the flow proceeds to step SA30 and the first region control is finished. If it is decided that the learning conditions have been formed at step SA21, the learning value is set at step SA23 as a period of time up to the point of time where the number of turbine revolutions starts decreasing, namely, as a period of time for the first region control. Then at step SA24, the difference between the optimal control time $t_T$ and the learning value is given and, at step SA25, it is distinguished whether or not the difference is equal to or larger than a set value. If the difference is larger than the set value at step SA25, the correction value $\Delta DU_0$ is determined from the map of FIG. 22D at step SA26. Then at step SA27, it is decided whether the difference is the negative number or the positive number. If the difference is decided larger than zero, namely, the positive number (+), at step SA27, then the correction value $\Delta DU_0$ is set as the positive number at step SA29, on the one hand, and if the difference is decided zero or smaller than zero, namely, the negative number (−), at step SA27, then the correction value $\Delta DU_0$ is set as the negative number at step SA28. Then the first region control is finished at step SA30.

If YES at step SA25, the flow proceeds to step SA30 where the first region control is completed.

Figure 26C:
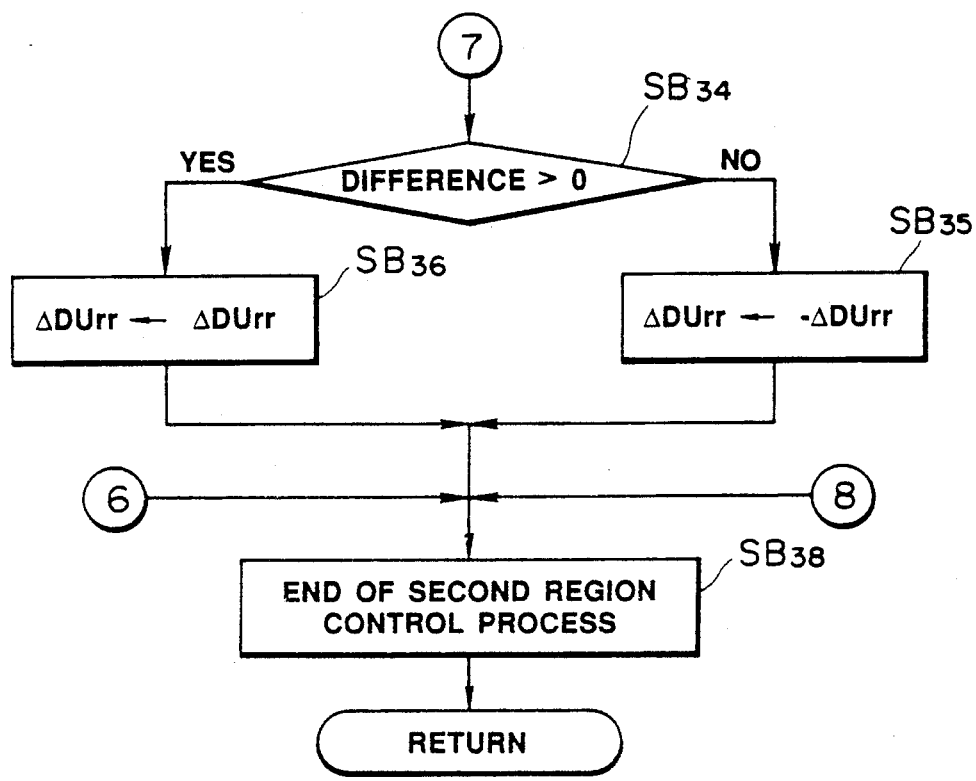

FIGS. 26A to 26C show the detail of the control routine SB for the second region control. In the routine, it is distinguished at step SB1 whether or not it is a point of time for transfer from the first region control to the second region control. If YES at step SB1, on the one hand, the flow proceeds to SB2 where a target number, $N_E$, of turbine revolutions after shifting the speed ranges is computed on the basis of a vehicle speed and a gear ratio. At step SB3, the optimal control time Tm is set by the map retrieval in accordance with a degree of throttle opening and speed ranges and, at step SB4, a drive solenoid pattern is decided by the map retrieval in accordance with the current speed range and the optimal speed range. Then at step SB5, the map is retrieved to set the change rate $\Delta DUr$ for the duty ratio, the minimum value DUr(min), and the maximum value DUr(max).

If NO at step SB1, namely, if it is not the point of time for transfer from the first region control to the second region control, on the other hand, it is then distinguished at step SB6 whether one of the duty solenoid valves is in the state of shifting for the feed-forward control. If the feed-forward control is not ready to execute at step SB6, the flow then proceeds to step SB18. If the feed-forward control is to be executed, the final duty ratio of the first region control at the point of time of transfer to the second region control is set as an initial value $DU_{00}$ and the change rate $\Delta DUr$ for the duty ratio is corrected by the correction value $\Delta DUrr$ obtained at the previous shifting (steps SB7 to SB9). As the process to be repeatedly executed for each control cycle, substantially the same process from steps SA11 to SA18 is executed for the duty solenoid valve to be subjected to the feed-forward control at steps SB10 to SB17, using the change rate $\Delta DUr$, the minimum value DUr(min) and the maximum value DUr(max), for the duty ratio. More specifically, if it is decided that it is not the point of time for transfer to the second region control at step SB7, the flow then proceeds to step SB10 and it is distinguished whether the duty ratio is increased or decreased. If it is decided that the duty ratio is decreased or increased at step SB10, the current duty ratio $DU_n$ is set by correcting the previous duty ratio $DU_{n-1}$ by the change rate $\Delta DUr$—in other words, by subtracting the change rate $\Delta DUr$ from the previous duty ratio $DU_{n-1}$ at step SB11 when it is decided that the duty ratio is decreased at step SB10 while by adding the change rate $\Delta DUr$ to the previous duty ratio $DU_{n-1}$ at step SB14 when it is decided that the duty ratio is increased at step SB10. After step SB11, the current duty ratio DUn is decided at step SB12 whether it is smaller than the minimum value DUr(min). If YES at step SB12, then the current duty ratio DUn is set as the minimum value DUr(min) at step SB13 and the flow advances to step SB18. If it is decided at step SB12 that the current duty ratio DUn is equal to or larger than the minimum value DUr(min), then the flow goes to step SB18. Furthermore, when it is decided that the duty ratio is increased at step SB10, the current duty ratio DUn is set at step SB14 by adding the change rate ΔDUr to the previous duty ratio $DU_{n-1}$ and the current duty ratio DUn is decided at step SB15 as to whether it is larger than the maximum value DUr(max). If YES at step SB15, then the current duty ratio DUn is set as the maximum value DUr(max) at step SB16 and the flow proceeds to step SB18. The flow goes to step SB18, too, if it is decided at step SB15 that the current duty ratio DUn is equal to or smaller than the maximum value DUr(max).

At step SB18, it is distinguished whether or not the feed-back control is in the process. If no feed-back control is required, the second region control is finished at step SB38 at the point of time when the optimal control time Tm has elapsed (step SB37). If the feed-back control is required at step SB18, then the change rate, αm, in numbers of turbine revolutions is computed on the basis of the number of turbine revolutions, $N_S$, immediately before at the point of time of transfer to the second region control (steps SB19 and SB20):

$$\alpha m = \frac{(N_S - N_E) \times 16}{Tm}$$

Then at step SB21, a target number of turbine revolutions, N(COM)n is computed for each control cycle by the following formula:

$$N(COM)n = N(COM)n_{-1} - \alpha m$$

Then it is distinguished whether the transmission is upshifted or downshifted at step SB22. If it is upshifted, on the one hand, the process of steps SB23 and SB24 is executed in which the target number of turbine revolutions, N(COM)n, for each control cycle is allowed to be kept equal to or larger than the target number of turbine revolutions, $N_E$, after shifting and the flow is returned until the actual number of turbine revolutions, N, reaches a value equal to or lower than the sum of the target number $N_E$ and the set value at step SB25. If it is downshifted at step SB22, on the other, substantially the same process as at steps SB23 to SB25 is likewise executed at steps SB26 to SB28 by inversing the relationship of the magnitude of the numbers of turbine revolutions.

Figure 27A:
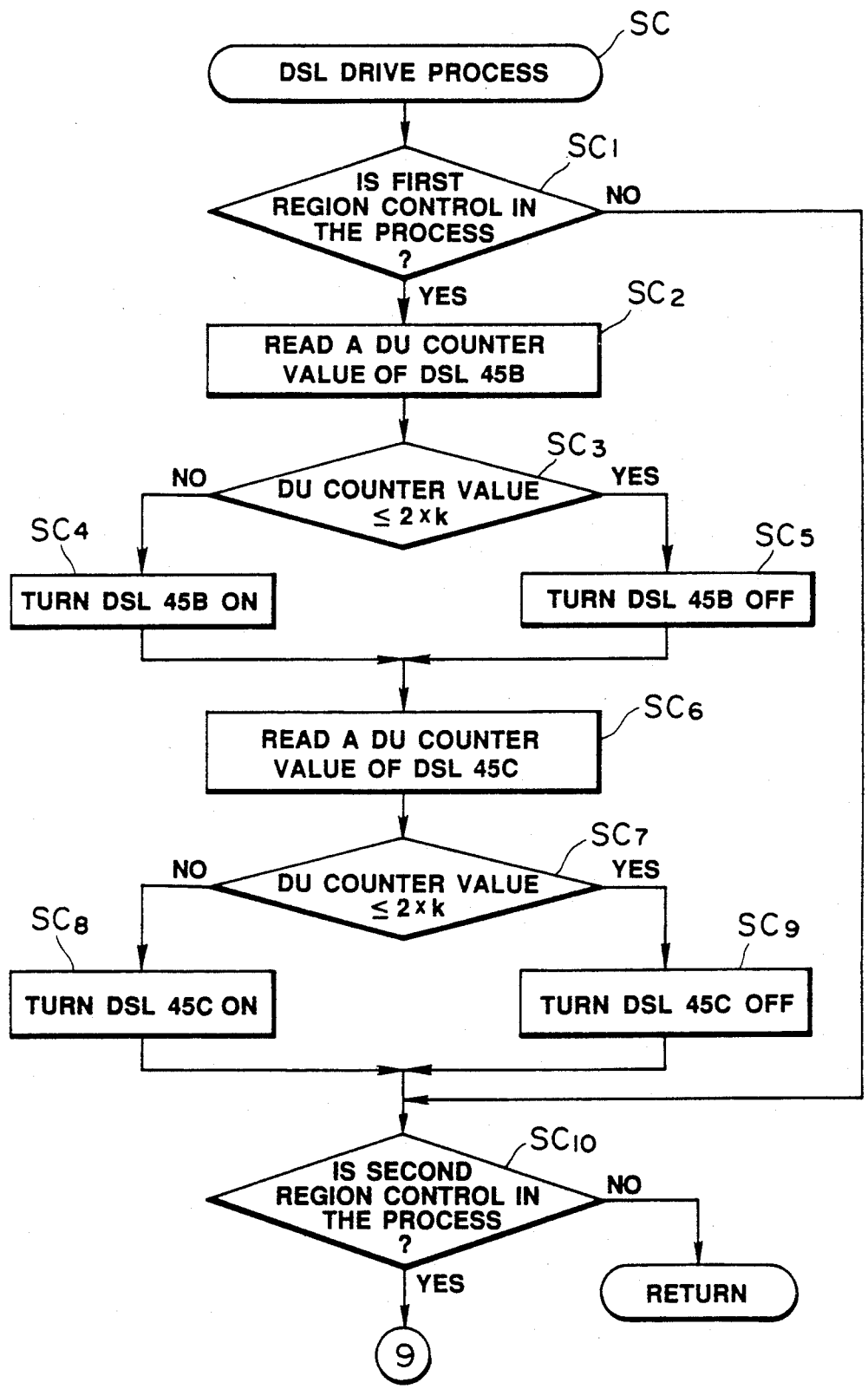
Figure 28:
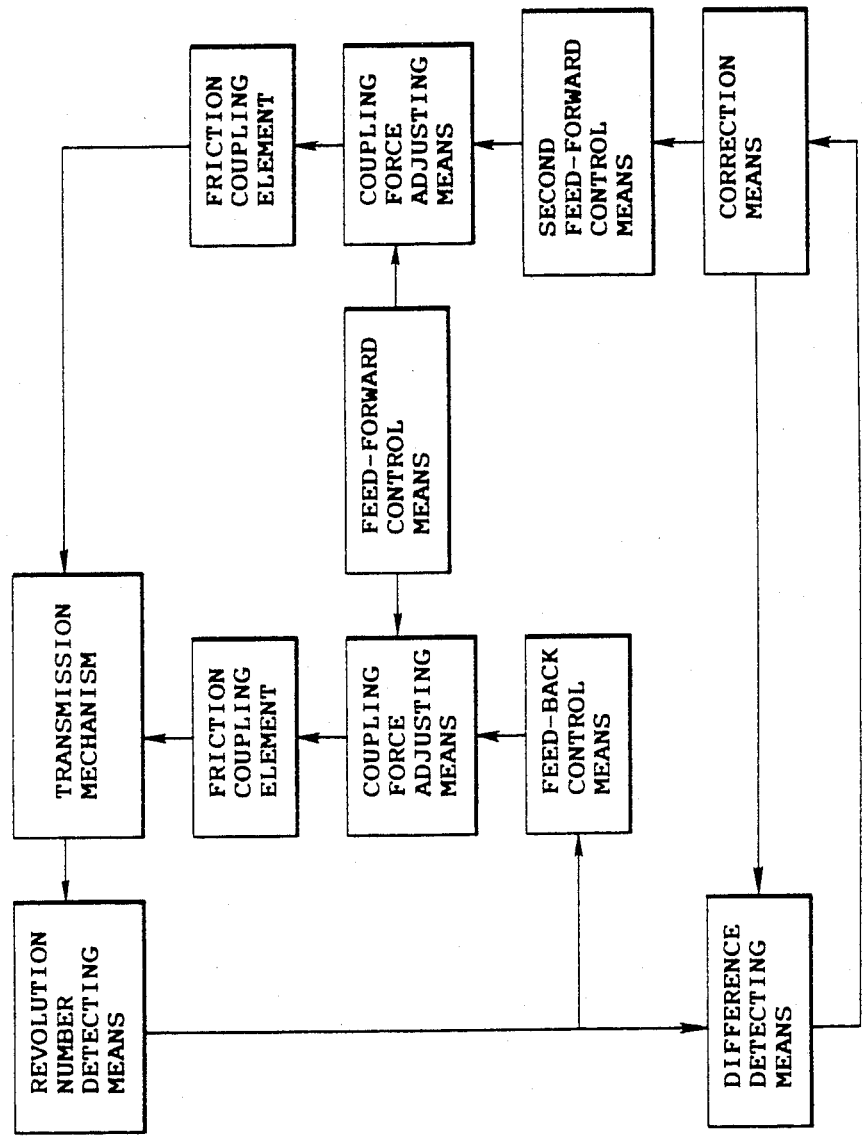
FIG. 28 is a block diagram showing the preferred embodiment of the present invention.

If the decision at step SB25 or SB28 is YES, it is then decided at step SB29 whether or not learning conditions for control time of the second region has been established. In this case, the learning conditions are set the same as that for control time of the first region. If it is decided at step SB29 that the learning conditions are not established yet, the second region control is finished at step SB38. If YES at step SB29, the learning of the control time of the second region is effected in the same manner as in the process first region control from step SA23 to step SA29 and the correction value ΔDUrr for the change rate ΔDUr of the duty ratio is determined (at steps SB30 to SB36). Then the second region control is finished at step SB38. FIGS. 27A and 27B show the duty solenoid valve drive routine to be executed by the interrupt routine separate from the routine shown in FIGS. 24 to 26C. This routine is executed for every 2 msec.

At step SC1, it is distinguished whether or not the first region is in the process of control and, if it is distinguished YES at step SC1, a counter value for the duty ratio for the duty solenoid valve 45B is read at step SC2. It is noted herein that the counter value is a value obtainable by translating the duty value DUn determined one after one per every control cycle of 16 msec in the first region control routine SA into a unit of time, namely, 16×DUn/100. Then at step SC3, it is determined whether the counter value is equal to or smaller than [2×k] (in which k is a value from 0 to 7 to be renewed per every 2 msec). If the decision is NO at step SC3, on the one hand, the duty solenoid valve 45B is kept ON at step SC4 and, if the decision is YES at step SC3, on the other, the duty solenoid valve 45B is turned OFF at step SC5. Substantially the same process as that from steps SC2 to SC5 is executed for the duty solenoid valve 45C at steps SC6 to SC9.

If it is decided at step SC1 that the first region is not in the process of control, then it is decided at step SC10 whether the second region is in the process of control. If YES at step SC10, the sub-routine process equivalent to the process from step SC2 to step SC5 is executed at step SC12 (SUB: DU2) in case that it is decided at step SC11 that the duty solenoid valve 45B is subjected to the feed-forward control and, in case that it is decided at step SC11 that the feed-back control should be executed, the control flag for the duty solenoid valve 45B is ON at step SC13. After the execution of the sub-routine process at step SC12 or after step SC13, the flow then advances to step SC14 where it is distinguished whether the duty solenoid valve 45C should be subjected to the feed-back control or to the feed-forward control. If it should be feed-forward controlled, the duty solenoid valve 45C is controlled by the execution of the sub-routine process at step SC15. If the duty solenoid valve 45C shoud be feed-back controlled at step SC14, the control flag for the duty solenoid valve 45C is ON at step SC16. Furthermore, if either of the duty solenoid valve 45B or 45C should be subjected to the feed-back control, namely, if it is decided at either of step SC17 or SC18 that the flag is ON, the feed-back control is executed for the duty solenoid valve concerned in accordance with the process from step SC19 to step SC28.

The feed-back control is executed first by reading, at step SC19, the target number of turbine revolutions, N(COM)n, for each control cycle set at step SB21 of the second region control routine and each control cycle and, at step SC20, the actual number of turbine revolutions, N. Then at step SC21, it is distinguished whether or not the transmission is upshifted or downshifted. If upshifted at step SC21, it is decided at step SC22 whether the target number of turbine revolutions, N(COM)n, is smaller than the actual number of turbine revolutions, N, while, if downshifted at step SC21, it is decided at step SC23 whether the target number of turbine revolutions, N(COM)n, is larger than the actual number of turbine revolutions, N.

If it is decided at step SC22 that the target number of turbine revolutions, N(COM)n, is smaller than the actual number of turbine revolutions, N, on the one hand, the flow proceeds to step SC24 whether it is distinguished whether or not the VALVE OFF flag is ON. If YES at step SC24, then the valve is turned ON at step SC26. If NO at step SC24, then the valve is turned OFF at step SC27. If it is decided at step SC22 that the target number N(COM)n is not smaller than the actual number N, on the other hand, the flow proceeds to step SC27 where the valve is turned OFF.

If it is decided at step SC23 that the target number N(COM)n is larger than the actual number N, on the one hand, it is then decided at step SC25 whether or not the VALVE OFF flag is ON. If YES at step SC25, the valve is turned OFF at step SC27. If NO at step SC25, the valve is turned ON at step SC26. If it is decided at step SC23 that the target number N(COM)n is not larger than the actual number N, on the other, then the valve is turned OFF at step SC27. Then at step SC28, the VALVE OFF flag is ON. The VALVE OFF flag is to prevent the valve from switching back to ON again in one control cycle after the switching from ON to OFF.

After step SC26 or after step SC28, the process from step SC29 to step SC31 is executed until k becomes 7. If k becomes 7, the VALVE OFF flag and the value k are cleared at step SC31 and the feed-back control as shown in FIG. 8 is executed.

With the arrangement for the control as have been described hereinabove, in the first region which extends up to the occurrence of a variation in the number of turbine revolutions by means of shifting, the feed-forward control is executed by the control routine process SA in FIGS. 25A to 25C and in the process from steps SC1 to SC9 of the duty solenoid drive routine in FIGS. 27A and 27B in accordance with characteristics predetermined by the change rate ΔDUr of the duty ratio and so on. This control adjusts coupling force of the friction coupling elements permitting an adequate variation in torque in the first region. In this case, on top of optimization for the first region control, the transfer from the first region control to the second region control can be made properly and smoothly by setting the optimal control time $t_T$ by means of the map of FIG. 22B and correcting the initial value $DU_0$ of the duty ratio by learning the control time of the first region in the course of the process from step SC20 to step SC22.

Furthermore, in the second region where numbers of turbine revolutions vary due to shifting, the feed-back control is executed by the process from step SC19 to step SC28 in the control routine SB as shown in FIGS. 26A to 26C and by the process from step SC19 to SC28 in the duty solenoid drive routine SC as shown in FIGS. 27A and 27B. This control permits an adjustment of coupling force of the friction coupling elements so as to allow the number of turbine revolutions to vary with a target value per each control cycle.

It is to be noted herein that the learning of the control time Tm in the second region control is implemented by correction of the change rate ΔDUr of the duty ratio and so on, permitting an adjustment of coupling force of the friction coupling elements with high accuracy.

It is to be understood that the foregoing text and drawings relate to embodiments of the present invention given by way of examples but not limitation. Various other embodiments and variants are possible within the spirit and scope of the invention.

What is claimed is:

1. A shift control apparatus of an automatic transmission adapted to shift speed ranges by switching the coupling and the decoupling of a friction coupling element mounted on a transmission mechanism, comprising:

revolution number detecting means for detecting a number of revolutions of an input shaft of the transmission mechanism;
coupling force adjusting means for adjusting coupling force of the friction coupling element;
control means for controlling coupling force of the friction coupling element by subjecting the coupling force adjusting means to a feed-forward control in accordance with a predetermined characteristic for a predetermined period after a shifting instruction signal and
for controlling coupling force of the friction coupling element by subjecting the coupling force adjusting means to feed-back control in accordance with a variation in the number of revolutions detected by the revolution number detecting means after the predetermined period elapses.

2. A shift control apparatus as claimed in claim 1, wherein the predetermined period is a set time.

3. A shift control apparatus as claimed in claim 2, wherein the set time is altered in accordance with engine load.

4. A shift control apparatus as claimed in claim 1, wherein a feed-forward control value for the control means against the coupling force adjusting means is a value varying from a predetermined initial value at a constant rate.

5. A shift control apparatus as claimed in claim 4, wherein said initial value is altered in accordance with engine load.

6. A shift control apparatus as claimed in claim 4, wherein the friction coupling element is hydraulically operable and wherein said constant rate is altered in accordance with oil temperature.

7. A shift control apparatus as claimed in claim 4, wherein said feed-forward control value is regulated so as not to exceed a limit.

8. A shift control apparatus as claimed in claim 5, wherein the initial value is corrected by learning.

9. A shift control apparatus as claimed in claim 8, wherein a learning correction value is determined on the basis of a control time ranging from the shifting instruction to detection of a large variation in the number of revolutions detected by the revolution number detecting means.

10. A shift control apparatus as claimed in claim 9, wherein the predetermined period for executing the feed-forward control is a set time determined by the magnitude of engine load; and
wherein the learning correction value is determined on the basis of a difference between the predetermined period and the control time.

11. A shift control apparatus as claimed in claim 1, wherein
a target change rate of number of revolutions is determined in the feed-back control on the basis of an amount of change in the number of revolutions of the input shaft estimated by shifting and on the basis of a set time in which the feed-back control is executed; and
wherein a target number of revolutions is determined for each of a plurality of control cycles on the basis of the target change rate, the control cycles being obtained by dividing the set time into plural portions; and wherein a control value for the coupling force adjusting means is determined on the basis of a comparison between the number of revolutions detected by the revolutions number detecting means and the target number of revolutions.

12. A shift control apparatus as claimed in claim 11, wherein the coupling force adjusting means is of an electromagnetic type operatively switching an ON state and an OFF state; and
wherein the control value is determined to be either in the ON state or the OFF state.

13. A shift control apparatus as claimed in claim 11, wherein the target revolution number is determined such that control cycles at an initial stage and at a final stage decrease the change rate of number of revolutions and control cycles at a middle stage increase the change rate thereof.

14. A shift control apparatus as claimed in claim 1, further comprising two friction coupling elements, wherein when shifting is executed by switching said two friction coupling elements the control means acts on one of said friction coupling elements by subjecting the coupling force thereof to feed-back control and by subjecting the coupling force of the other friction coupling element to feed-forward control during a control time.

15. A shift control apparatus as claimed in claim 14, wherein the feed-back control of the one friction coupling element is controlled so as to allow a number of revolutions detected by the revolution number detecting means to amount to a target number of revolutions set on the basis of a given condition;
wherein the feed-forward control on the other friction coupling element controls a number of revolutions of the input shaft so as to vary with a given target change rate; and
wherein a difference is detected between a change rate of the number of revolutions detected by the revolution number detecting means and the target change rate thereof and wherein the target change rate is corrected on the basis of the detected difference.

16. A shift control apparatus as claimed in claim 1, wherein a learning value is reflected on at least a control value for either of the feed-forward control or the feed-back control by determining the learning value on the basis of a final control value.

17. A shift control apparatus as claimed in claim 11, wherein a learning value is reflected on a control value of the feed-back control, in which the learning value is computed from a final control value of the feed-back control and a mean control value for each of the control cycles.

18. A shift control apparatus as claimed in claim 17, wherein the learning value computed is corrected in accordance with oil temperature.

19. A shift control apparatus as claimed in claim 17, wherein the learning value computed is corrected in accordance with a mode of shifting.

20. A shift control apparatus as claimed in claim 7, wherein a learning value is reflected on a control value of the feed-back control, in which the learning value is determined on the basis of the limit value, a constant change rate from the initial value, and a time elapsed until amounting to the limit value.

21. A shift control apparatus as claimed in claim 20, wherein the learning value is further corrected in accordance with oil temperature.

22. A shift control apparatus as claimed in claim 4, wherein the coupling force adjusting means comprises a duty solenoid operable by switching the ON state and the OFF state; and
wherein the control value of the feed-forward control is determined as a duty ratio with respect to the duty solenoid.

23. A shift control apparatus of an automatic transmission adapted to shift speed ranges by switching the coupling and the decoupling of a friction coupling element mounted on a transmission mechanism, comprising:
revolution number detecting means for detecting a number of revolutions of an input shaft of the transmission mechanism;
coupling force adjusting means for adjusting coupling force of the friction coupling element;
control means for subjecting the coupling force adjusting means to feed-forward control in accordance with a control value characteristic set so as to vary the control value from a predetermined initial value at a constant change rate during a predetermined period after a shifting instruction signal and
for subjecting the coupling force means to feed-back control after the predetermined period elapses;
wherein a target change rate of number of revolutions is determined in the feed-back control on the basis of an amount of change in the number of revolutions of the input shaft estimated by shifting and on the basis of a set time in which the feed-back control is executed; and wherein a target number of revolutions for each of a plurality of control cycles is determined on the basis of the target change rate, the control cycles being obtained by dividing the set time into plural portions; and wherein a control value for the coupling force adjusting means is determined on the basis of a comparison between the number of revolutions detected by the revolution number detecting means and the target number of revolutions.

24. A shift control method for an automatic transmission adapted to shift speed ranges by switching the coupling and the decoupling of a friction coupling element mounted on a transmission mechanism, comprising the steps of:
subjecting a coupling force of the friction coupling element to feed-forward control in accordance with a control characteristic so as to vary a control value from an initial value at a constant rate for a predetermined period after a shifting instruction signal; and
subjecting the coupling force of the friction coupling element to feed-back control after the predetermined period elapses in such a manner that a final control value for the feed-back control is determined by determining a target change rate of a number of revolutions in the feed-back control on the basis of an amount of change in number of revolutions on an input shaft of the transmission mechanism estimated by shifting, by determining a target number of revolutions for each of plural control cycles obtained by dividing the set time into plural portions on the basis of the target change rate, and by determining the final control value for each of the control cycles on the basis of a comparison of an actual number of revolutions of the input shaft and the target number of revolutions.

* * * * *